US012769778B1

(12) United States Patent
Kacewicz

(10) Patent No.: US 12,769,778 B1
(45) Date of Patent: Oct. 20, 2026

(54) HIGHLY ANOMALOUS DATA DETECTION IN ANALYTICS SERVICE

(71) Applicant: Cisco Technology, Inc., San Jose, CA (US)

(72) Inventor: Ania Kacewicz, Baltimore, MD (US)

(73) Assignee: Cisco Technology, Inc., San Jose, CA (US)

( * ) Notice: Subject to any disclaimer, the term of this patent is extended or adjusted under 35 U.S.C. 154(b) by 163 days.

(21) Appl. No.: 18/428,283

(22) Filed: Jan. 31, 2024

(51) Int. Cl.
*G06F 16/00* (2019.01)
*G06F 16/28* (2019.01)
*G06F 16/35* (2019.01)

(52) U.S. Cl.
CPC ............ *G06F 16/35* (2019.01); *G06F 16/285* (2019.01)

(58) Field of Classification Search
CPC .... G06F 16/144; G06F 16/156; G06F 16/168; G06F 16/22; G06F 16/23; G06F 16/242; G06F 16/285; G06F 16/901; G06F 17/16; G06F 17/18; G06F 9/544; G06F 16/951; G06F 21/552; G06F 21/554; G06F 2221/034; G06F 21/52; G06F 9/50; G06F 16/24; G06F 16/245; G06F 16/248; G06N 20/00; G06N 20/20; G06N 5/022; G06N 5/04; H04L 41/046; H04L 41/145; H04L 41/22; H04L 43/045; H04L 43/06; H04L 43/08; H04L 63/20; G06Q 20/382
See application file for complete search history.

(56) References Cited

U.S. PATENT DOCUMENTS

| | | | | |
|---|---|---|---|---|
| 7,937,344 | B2 | 5/2011 | Baum et al. | |
| 8,112,425 | B2 | 2/2012 | Baum et al. | |
| 8,751,529 | B2 | 6/2014 | Zhang et al. | |
| 8,788,525 | B2 | 7/2014 | Neels et al. | |
| 9,215,240 | B2 | 12/2015 | Merza et al. | |
| 9,286,413 | B1 | 3/2016 | Coates et al. | |
| 10,127,258 | B2 | 11/2018 | Lamas et al. | |
| 12,088,600 | B1 * | 9/2024 | Beauchesne | G06N 5/01 |
| 2016/0196236 | A1 * | 7/2016 | Al Sobhi | G06F 30/20 703/2 |
| 2019/0098106 | A1 | 3/2019 | Mungel et al. | |

(Continued)

OTHER PUBLICATIONS

Splunk Enterprise 8.0.0 Overview, available online, retrieved May 20, 2020 from docs.splunk.com.

(Continued)

*Primary Examiner* — Shyue Jiunn Hwa
(74) *Attorney, Agent, or Firm* — Shook, Hardy & Bacon L.L.P.

(57) ABSTRACT

Embodiments described herein are directed to facilitating efficient detection of highly anomalous data. In one embodiment, one or more maximum values within a set of aggregated values corresponding with a sequence of time spans are identified. An extreme value distribution is generated based on the one or more maximum values. Thereafter, a highly anomalous threshold is determined using a confidence threshold and the extreme value distribution based on the one or more maximum values. A highly anomalous data value associated with a security-related analysis is identified based on the highly anomalous threshold. An indication of the highly anomalous data value associated with the security-related analysis is provided for display.

20 Claims, 18 Drawing Sheets

(56) References Cited

U.S. PATENT DOCUMENTS

| | | | | |
|---|---|---|---|---|
| 2022/0215091 | A1* | 7/2022 | Dangoor | G06F 21/554 |
| 2024/0112053 | A1* | 4/2024 | Boue | G06F 17/18 |
| 2024/0127418 | A1* | 4/2024 | Decker | G06T 7/0004 |
| 2024/0129323 | A1* | 4/2024 | Garyani | G06F 21/554 |

OTHER PUBLICATIONS

Splunk Cloud 8.0.2004 User Manual, available online, retrieved May 20, 2020 from docs.splunk.com.

Splunk Quick Reference Guide, updated 2019, available online at https://www.splunk.com/pdfs/solution-guides/splunk-quick-reference-guide.pdf, retrieved May 20, 2020.

Carraso, David, "Exploring Splunk," published by CITO Research, New York, NY, Apr. 2012.

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

302

302A

```
127.0.0.1 – eva [10/Oct/2000:13:55:36-0700] "GET/apache.gif HTTP/1.0" 200 2326 0.0947
127.0.0.1 – emerson [10/Oct/2000:13:56:36-0700] "GET/eastwood.gif HTTP/1.0" 200 2980
0.0899
```

302C 302B

```
127.0.0.3 – eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/
pub_html/images/alisia.gif
```

302E 302D

```
91.205.189.15 - - [28/Apr/2014:18:22:16] *GET /oldlink?itemId=EST-
14&JSESSIONID=SD6SL7FF7ADFF53113 HTTP 1.1" 200 1665 "http://
www.buttercupgames.com/oldlink?itemId=EST-14" "Mozilla/5.0 (Windwos NT 6.1; WOW 64)
AppleWebKit/536.5 (KHTML, like Gecko) Chrome/19.0.1084.46 Safari/536.5" 159
```

304

304A

304B

```
docker: {
        container_id: f7360a148a670c4c257f4ee024be81284b6017d72ae41ea8ee5d
}
kubernetes: {
       container_name: kube-apiserver
       host: ip-172-20-43-173.ec2.internal
       labels: {
         k8s-app: kube-apiserver
       }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal
}
log: I0503 23:04:12.595203    1 wrap.go:42] GET /apis/admissionregistrations.k8s.io/v1beta1/
validatingwebhookconfiguration 200 [[kube-apiserver/v1.9.3 (linux/amd64) kubernetes/d283541]
127.0.0.1:55026

stream: stdout
time: 2018-05-03T23:04:12.619948395Z
}
```

306

| time | ID | CPU | memory |
|---|---|---|---|
| 10/10/00 12:01:00.013 | eliza | 14% | 80% |
| 10/10/00 12:01:05.153 | eva | 26% | 70% |

*FIG. 3A*

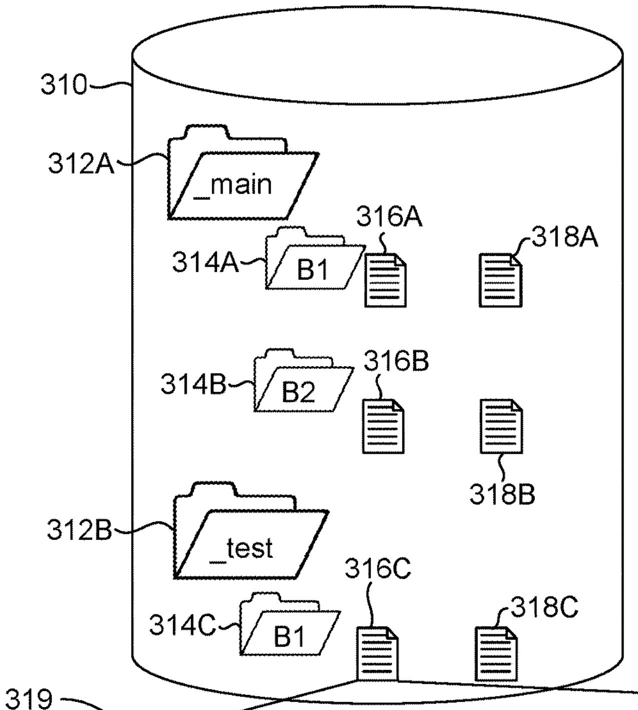

FIG. 3B

319

| | Time 332 | Machine Data 330 | Host 334 | Source 336 | Sourcetype 338 |
|---|---|---|---|---|---|
| 320 | 10/10/2000 1:55 p.m. | 1140 1141 1142 127.0.0.1 – eva [10/Oct/2000:13:55:36-0700] “GET/apache.gif 1143 HTTP/1.0” 200 2326 0.0947 1146 1144 1145 | www1 | access.log | access_combined |
| 322 | 10/10/2000 1:56 p.m. | 127.0.0.1 – emerson [10/Oct/2000:13:56:36-0700] “GET/ eastwood.gif HTTP/1.0” 200 2980 0.0899 | www2 | access.log | access_combined |
| 324 | 10/10/2000 1:57 p.m. | 127.0.0.3 – eliza [10/Oct/2000:13:57:36-0700] “GET/ezra.gif HTTP/1.0” 200 2900 0.0857 | www2 | access.log | access_combined |
| 326 | 10/10/2000 1:58 p.m. | [Sunday Oct 10 1:58:33 2010] [error] [client 127.10.1.1.015] File does not exist: /home/emmeline/pub_html/images/alisia.gif | www2 | error.log | apache_error |

319

| | Time 332 | Machine Data 330 | Host 334 | Source 336 | Sourcetype 338 |
|---|---|---|---|---|---|
| 320 | 10/10/2000 1:55 p.m. | 127.0.0.1 – eva [10/Oct/2000:13:55:36-0700] “GET/apache.gif HTTP/1.0” 200 2326 0.0947 | www1 | access.log | access_combined |
| 322 | 10/10/2000 1:56 p.m. | 127.0.0.1 – emerson [10/Oct/2000:13:56:36-0700] “GET/ eastwood.gif HTTP/1.0” 200 2980 0.0899 | www2 | access.log | access_combined |
| 324 | 10/10/2000 1:57 p.m. | 127.0.0.3 – eliza [10/Oct/2000:13:57:36-0700] “GET/ezra.gif HTTP/1.0” 200 2900 0.0857 | www2 | access.log | access_combined |
| 326 | 10/10/2000 1:58 p.m. | [Sunday Oct 10 1:58:33 2010] [error] [client 127.10.1.1.015] File does not exist: /home/emmeline/pub_html/images/alisia.gif | www2 | error.log | apache_error |

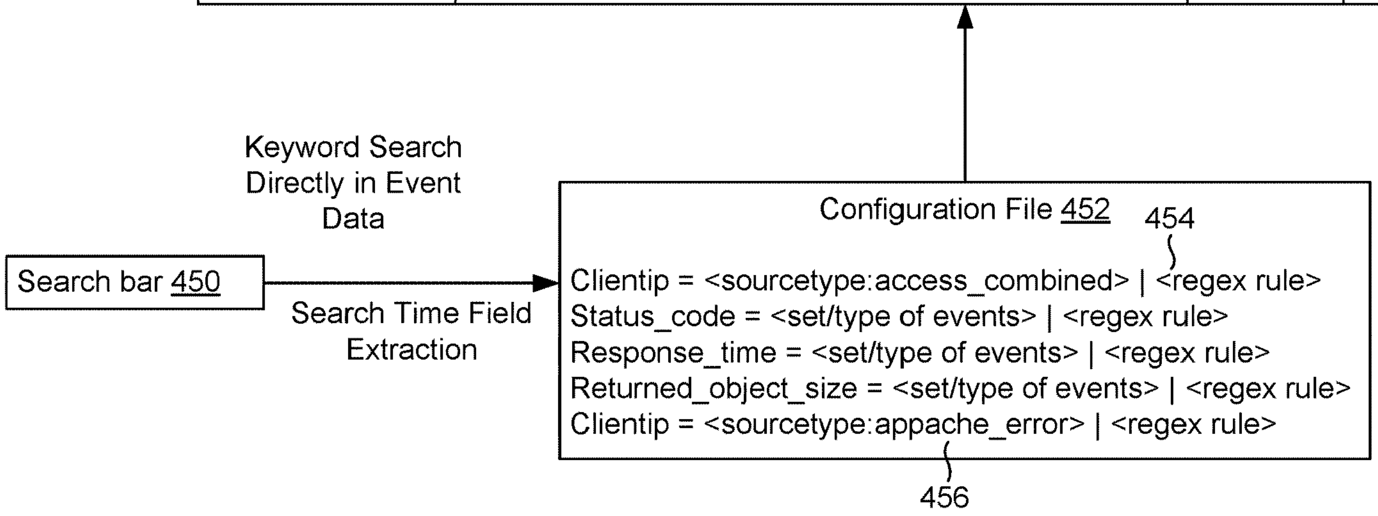

*FIG. 4C*

```
    modelClassName: com.splunk.ssa.batch.poc.models.extremevalues.loginfailures.LoginFailuresExtremeModel
    lookBackPeriodInDays: 1000
    dateToRun: '2023-10-12'
    ocsfEventClasses:
      - '3002'
    anomalyType: Unusual Volume of Login Failures
704~ aggregatedFeatureColumnName: totalFailedLogins
    dataFormats: []
    eventCodesToUse:
      - 'LOGIN'
      - 'FAILED_LOGIN'
712~ confidence: 0.9
702~ featureColumnName: isFailedLogin
    featureGroupByFields:
706~   - user__name
      - user__uuid
708~ isSparse: true
    isDebugMode: true
    modelGroupByFields:
      - user__name
      - user_uuid
710~ temporalAggregationSeconds: 600
    numberOfSamplesToCreateMax: 30
    minSamples: 5
    minimumFeatureValue: 7
    historicOutputTableName: loginFailures
714~ maxNumberOfHistoricDays: 30
    userEntities:
      - id: user__uuid
        name: user__name
        type: user__type_id
    deviceEntities:
```

FIG. 7

HIGHLY ANOMALOUS DATA DETECTION IN ANALYTICS SERVICE

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Information technology (IT) environments can include diverse types of data systems that store large amounts of diverse data types generated by numerous devices. For example, a big data ecosystem may include databases such as MySQL and Oracle databases, cloud computing services such as Amazon Web Services (AWS), and other data systems that store passively or actively generated data, including machine-generated data ("machine data"). The machine data can include log data, performance data, diagnostic data, metrics, tracing data, or any other data that can be analyzed to diagnose equipment performance problems, monitor user interactions, and to derive other insights.

The large amount and diversity of data systems containing large amounts of structured, semi-structured, and unstructured data relevant to any search query can be massive, and continues to grow rapidly. This technological evolution can give rise to various challenges in relation to managing, understanding, and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later can provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 3A is a block diagram illustrating an embodiment of machine data received by the data intake and query system.

FIGS. 3B and 3C are block diagrams illustrating embodiments of various data structures for storing data processed by the data intake and query system.

FIG. 4C is a block diagram illustrating an embodiment of a configuration file that includes various extraction rules that can be applied to events.

FIG. 7 provides an example of highly anomalous attributes provided via a configuration file, in accordance with various embodiments of the present technology FIG. 8 provides an example of identifying maximum values in association with sparse data, in accordance with embodiments described herein FIG. 9 provides an example of identifying maximum values in association with dense data, in accordance with embodiments described herein.

DETAILED DESCRIPTION

Figure 1:
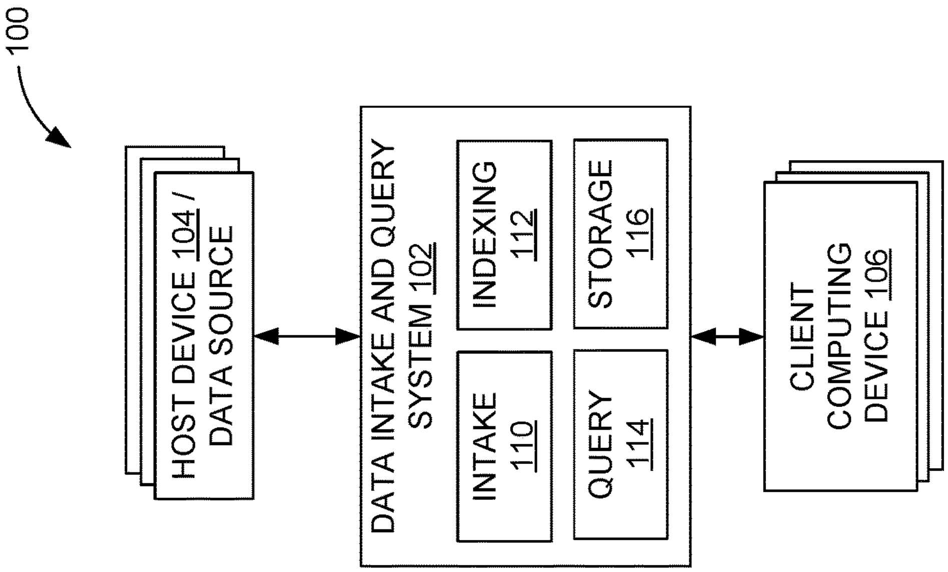
FIG. 1 is a block diagram of an embodiment of a data processing environment.

Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet-of-Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that concurrently report these types of information.

These challenges can be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data that is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The timestamp may be derived from the portion of machine data in the event, determined through interpolation between temporally proximate events having known timestamps, and/or may be determined based on other configurable rules for associating timestamps with events.

In some instances, machine data can have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components that may generate machine data from which events can be derived include, but are not limited to, web servers, application servers, databases, firewalls, routers, operating systems, and software applications that execute on computer systems, mobile devices, sensors, Internet-of-Things (IoT) devices, etc. The machine data generated by such data sources can include, for example and without limitation, server log files, activity log files, configuration files, messages, network packet data, performance measurements, sensor measurements, etc.

The data intake and query system can use flexible schema to specify how to extract information from events. A flexible schema may be developed and redefined as needed. The flexible schema can be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events, each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms can further process the event data, such as by transforming the data, etc.

As used herein, the term "field" can refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically related (such as by IP address), even though the machine data in each event may be in different formats (e.g., semantically related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field search the machine data of events to identify events that have the field name "UserID." In another example, a search having criteria that specifies a field name "UserID" with a corresponding field value "12345" may cause the system to field search the machine data of events to identify events having that field-value pair (e.g., field name "UserID" with a corresponding field value of "12345"). Events are field-searchable using one or more configuration files associated with the events. Each configuration file can include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or sourcetype. When events are to be searched based on a particular field name specified in a search, the system can use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system can utilize a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data-ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above can be stored in a catalog, such as a metadata catalog. In certain embodiments, the content of the extraction rules can be stored as rules or actions in the metadata catalog. For example, the identification of the data to which the extraction rule applies can be referred to a rule, and the processing of the data can be referred to as an action.

1.0. Operating Environment

FIG. 1 is a block diagram of an embodiment of a data-processing environment 100. In the illustrated embodiment, the environment 100 includes a data intake and query system 102, one or more host devices 104, and one or more client computing devices 106 (generically referred to as client device[s] 106).

The data intake and query system 102, host devices 104, and client devices 106 can communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 can communicate with a host device 104 via one or more networks. For example, if the host device 104 is configured as a web server and the client computing device 106 is a laptop, the laptop can communicate with the web server to view a website.

A client device 106 can correspond to a distinct computing device that can configure, manage, or send queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the system 102 (or a host device 104) in a variety of ways. For example, the client devices 106 can communicate with the system 102 (or a host device 104) over an Internet (Web) protocol, via a gateway, via a command line interface, via a software developer kit (SDK), a standalone application, etc. As another example, the client devices 106 can use one or more executable applications or programs to interface with the system 102.

A host device 104 can correspond to a distinct computing device or system that includes or has access to data that can be ingested, indexed, and/or searched by the system 102. Accordingly, in some cases, a client device 106 may also be a host device 104 (e.g., it can include data that is ingested by the system 102, and it can submit queries to the system 102). The host devices 104 can include, but are not limited to, servers, sensors, routers, personal computers, mobile devices, Internet-of-Things (IoT) devices, or hosting devices, such as computing devices in a shared computing resource environment on which multiple isolated execution environments (e.g., virtual machines, containers, etc.) can be instantiated, or other computing devices in an IT environment (e.g., device that includes computer hardware, e.g., processors, non-transitory, computer-readable media, etc.). In certain cases, a host device 104 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned, host devices 104 can include or have access to data sources for the system 102. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol [AMQP]), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization techniques or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases can be used as a data source for the system 102.

In some embodiments, an application may include a monitoring component that facilitates generating performance data related to the host device's operating state, including monitoring network traffic sent and received from the host device and collecting other device-and/or application-specific information. A monitoring component may be an integrated component of the application, a plug-in, an extension, or any other type of add-on component, or a standalone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time [s], failure, etc.) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "network latency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 can retrieve and return the requested data from a particular data source, and/or the system 102 can retrieve the data from a particular data source of the host device 104 (e.g., from a particular file stored on a host device 104).

The data intake and query system 102 can ingest, index, and/or store data from heterogeneous data sources and/or host devices 104. For example, the system 102 can ingest, index, and/or store any type of machine data, regardless of the form of the machine data or whether the machine data matches or is similar to other machine data ingested, indexed, and/or stored by the system 102. In some cases, the system 102 can generate events from the received data, group the events, and store the events in buckets. The system 102 can also search heterogeneous data that it has stored or search data stored by other systems (e.g., other system 102 systems or other non-system 102 systems). For example, in response to received queries, the system 102 can assign one or more components to search events stored in the storage system or search data stored elsewhere.

As will be described herein in greater detail below, the system 102 can use one or more components to ingest, index, store, and/or search data. In some embodiments, the system 102 is implemented as a distributed system that uses multiple components to perform its various functions. For example, the system 102 can include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, and 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 can refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 can receive data from the host devices 104 or data sources, perform one or more preliminary processing operations on the data, and communicate the data to the indexing system 112, query system 114, storage system 116, or to other systems (which may include, for example, data-processing systems, telemetry systems, real-time analytics systems, data stores, databases, etc., any of which may be operated by an operator of the system 102 or a third party). Given the amount of data that can be ingested by the intake system 110, in some embodiments, the intake system can include multiple distributed computing devices or components working concurrently to ingest the data.

The intake system 110 can receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 can include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 can route the data to a particular component of the intake system 110 or dynamically route the data based on load-balancing, etc. In certain cases, one or more components of the intake system 110 can be installed on a host device 104.

1.4.2. Indexing System Overview

As will be described in greater detail herein, the indexing system 112 can include one or more components (e.g., indexing nodes) to process the data and store it, for example, in the storage system 116. As part of processing the data, the indexing system can identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 can update various catalogs or databases with information related to the buckets (pre-merged or merged) or data that is stored in the storage system 116, and can communicate with the intake system 110 about the status of the data storage.

As will be described in greater detail herein, the query system 114 can include one or more components to receive, process, and execute queries. In some cases, the query system 114 can use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node can be a separate computing device or hosted device from an indexing node.

Queries received by the query system 114 can be relatively complex and identify a set of data to be processed and a manner of processing the set of data from one or more client devices 106. In certain cases, the query can be implemented using a pipelined command language or other query language. As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 can be made up of one or more data stores storing data that has been processed by the indexing system 112. In some cases, the storage system includes data stores of the components of the indexing system 112 and/or query system 114. In certain embodiments, the storage system 116 can be implemented as a shared storage system 116. The shared storage system 116 can be configured to provide high-availability, highly resilient, low-loss data storage. In some cases, to provide the high-availability, highly resilient, low-loss data storage, the shared storage system 116 can store multiple copies of the data in the same and different geographic locations and across different types of data stores (e.g., solid-state, hard drive, tape, etc.). Further, as data is received at the shared storage system 116, it can be automatically replicated multiple times according to a replication factor to different data stores across the same and/or different geographic locations. In some embodiments, the shared storage system 116 can correspond to cloud storage, such as Amazon Simple Storage Service (S3) or Elastic Block Storage (EBS), Google Cloud Storage, Microsoft Azure Storage, etc.

In some embodiments, indexing system 112 can read to and write from the shared storage system 116. For example, the indexing system 112 can copy buckets of data from its local or shared data stores to the shared storage system 116. In certain embodiments, the query system 114 can read from, but cannot write to, the shared storage system 116. For example, the query system 114 can read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 can write data to the shared storage system 116 that can be read by the indexing system 112.

As described herein, in some embodiments, data in the system 102 (e.g., in the data stores of the components of the indexing system 112, shared storage system 116, or search nodes of the query system 114) can be stored in one or more time series buckets. Each bucket can include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc., can be stored in respective files in or associated with a bucket. In certain cases, the group of files can be associated together to form the bucket.

The system 102 can include additional components that interact with any one or any combination of the intake system 110, indexing system 112, query system 114, and/or storage system 116. Such components may include, but are not limited to, an authentication system, orchestration system, one or more catalogs or databases, a gateway, etc.

An authentication system can include one or more components to authenticate users to access, use, and/or configure the system 102. Similarly, the authentication system can be used to restrict what a particular user can do on the system 102 and/or what components or data a user can access, etc.

An orchestration system can include one or more components to manage and/or monitor the various components of the system 102. In some embodiments, the orchestration system can monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system can determine when to add components to or remove components from a particular system 110, 112, 114, and 116 (e.g., based on usage, user/tenant requests, etc.). In embodiments where the system 102 is implemented in a shared computing resource environment, the orchestration system can facilitate the creation and/or destruction of isolated execution environments or instances of the components of the system 102, etc.

In certain embodiments, the system 102 can include various components that enable it to provide stateless services or enable it to recover from an unavailable or unresponsive component without data loss in a time efficient manner. For example, the system 102 can store contextual information about its various components in a distributed way such that if one of the components becomes unresponsive or unavailable, the system 102 can replace the unavailable component with a different component and provide the replacement component with the contextual information. In this way, the system 102 can quickly recover from an unresponsive or unavailable component while reducing or eliminating the loss of data that was being processed by the unavailable component.

In some embodiments, the system 102 can store the contextual information in a catalog, as described herein. In certain embodiments, the contextual information can correspond to information that the system 102 has determined or learned based on use. In some cases, the contextual information can be stored as annotations (manual annotations and/or system annotations), as described herein.

In certain embodiments, the system 102 can include an additional catalog that monitors the location and storage of data in the storage system 116 to facilitate efficient access of the data during search time. In certain embodiments, such a catalog may form part of the storage system 116.

In some embodiments, the system 102 can include a gateway or other mechanism to interact with external devices or to facilitate communications between components of the system 102. In some embodiments, the gateway can be implemented using an application programming interface (API). In certain embodiments, the gateway can be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 can be implemented in a shared computing resource environment. In this context, a shared computing resource environment or cloud-based service can refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute can be shared by multiple customers or tenants as part of the shared computing resource environment. In addition, when implemented in a shared computing resource environment as a cloud-based service, various components of the system 102 can be implemented using containerization or operating-system-level virtualization, or other virtualization technique. For example, one or more components of the intake system 110, indexing system 112, or query system 114 can be implemented as separate software containers or container instances. Each container instance can have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from the memory space of other containers. Further, each container may run the same or different computer applications concurrently or separately, and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment can provide a number of benefits. In some cases, implementing the system 102 in a shared computing resource environment can make it easier to install, maintain, and update the components of the system 102. For example, rather than accessing designated hardware at a particular location to install or provide a component of the system 102, a component can be remotely instantiated or updated as desired. Similarly, implementing the system 102 in a shared computing resource environment or as a cloud-based service can make it easier to meet dynamic demand. For example, if the system 102 experiences significant load at indexing or search, additional compute resources can be deployed to process the additional data or queries. In an "on-premises" environment, this type of flexibility and scalability may not be possible or feasible.

In addition, by implementing the system 102 in a shared computing resource environment or as a cloud-based service can improve compute resource utilization. For example, in an on-premises environment, if the designated compute resources are not being used, they may sit idle and unused. In a shared computing resource environment, if the compute resources for a particular component are not being used, they can be reallocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 can be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 can maintain logical separation between tenant data. For example, the system 102 can include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part of) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer A's hard drive, and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 can maintain the mutual exclusivity and/or independence between tenant data even as the tenant data is being processed, stored, and searched by the same underlying hardware. In certain cases, to maintain the mutual exclusivity and/or independence between the data of different tenants, the system 102 can use tenant identifiers to uniquely identify data associated with different tenants.

In a shared computing resource environment, some components of the system 102 can be instantiated and designated for individual tenants, and other components can be shared by multiple tenants. In certain embodiments, a separate intake system 110, indexing system 112, and query system 114 can be instantiated for each tenant, whereas the shared storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the system 102 can use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffers, etc.) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) can be instantiated and designated for a particular tenant or shared by multiple tenants. In some embodiments where a separate indexing system 112 is instantiated and designated for each tenant, different resources can be reserved for different tenants. For example, Tenant A can be consistently allocated a minimum of four indexing nodes, and Tenant B can be consistently allocated a minimum of two indexing nodes. In some such embodiments, the four indexing nodes can be reserved for Tenant A, and the two indexing nodes can be reserved for Tenant B, even if Tenant A and Tenant B are not using the reserved indexing nodes.

In embodiments where an indexing system 112 is shared by multiple tenants, components of the indexing system 112 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant, or terminated. Further, in some embodiments, a component of the indexing system 112 can concurrently process data from the different tenants.

In some embodiments, one instance of query system 114 may be shared by multiple tenants. In some such cases, the same search head can be used to process/execute queries for different tenants, and/or the same search nodes can be used to execute queries for different tenants. Further, in some such cases, different tenants can be allocated different amounts of compute resources. For example, Tenant A may be assigned more search heads or search nodes than another tenant based on demand or based on a service-level arrangement. However, once a search is completed, the search head and/or nodes assigned to Tenant A may be assigned to Tenant B, deactivated, or their resource may be reallocated to other components of the system 102, etc.

In some cases, by sharing more components with different tenants, the functioning of the system 102 can be improved. For example, by sharing components across tenants, the system 102 can improve resource utilization, thereby reducing the amount of resources allocated as a whole. For example, if four indexing nodes, two search heads, and four search nodes are reserved for each tenant, then those compute resources are unavailable for use by other processes or tenants, even if they go unused. In contrast, by sharing the indexing nodes, search heads, and search nodes with different tenants and instantiating additional compute resources, the system 102 can use fewer resources overall while providing improved processing time for the tenants that are using the compute resources. For example, if tenant A is not using any search nodes 506 and tenant B has many searches running, the system 102 can use search nodes that would have been reserved for tenant A to service tenant B. In this way, the system 102 can decrease the number of compute resources used/reserved, while improving the search time for tenant B and improving compute resource utilization.

2.0. Data Ingestion, Indexing, and Storage

Figure 2:
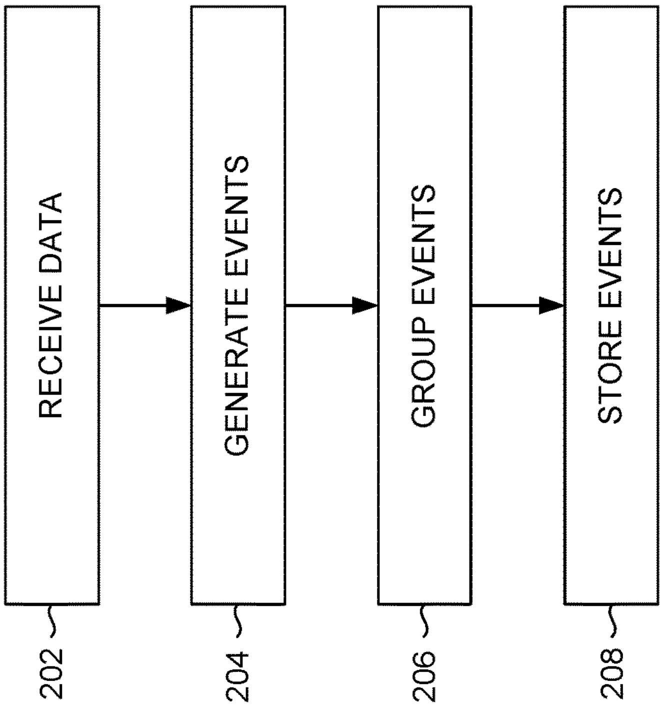
FIG. 2 is a flow diagram illustrating an embodiment of a routine implemented by the data intake and query system to process, index, and store data.

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data, and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that can be received by the intake system 110 are described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 can parse the data of the message. In some embodiments, the indexing system 112 can determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 can apply an inferred sourcetype definition to the data to create the events.

In addition, as part of generating events from the data, the indexing system 112 can determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 can also associate events with one or more metadata fields. In some embodiments, a timestamp may be included in the metadata fields. These metadata fields may include any number of "default fields" that are associated with all events, and may also include one or more custom fields as defined by a user. In certain embodiments, the default metadata fields associated with each event may include a host, source, and sourcetype field including or in addition to a field storing the timestamp.

In certain embodiments, the indexing system 112 can also apply one or more transformations to event data that is to be included in an event. For example, such transformations can include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 can group events. In some embodiments, the indexing system 112 can group events based on time. For example, events generated within a particular time period or events that have a timestamp within a particular time period can be grouped together to form a bucket. A non-limiting example of a bucket is described herein with reference to FIG. 3B.

In certain embodiments, multiple components of the indexing system, such as an indexing node, can concurrently generate events and buckets. Furthermore, each indexing node that generates and groups events can concurrently generate multiple buckets. For example, multiple processors of an indexing node can concurrently process data, generate events, and generate buckets. Further, multiple indexing nodes can concurrently generate events and buckets. As such, ingested data can be processed in a highly distributed manner.

In some embodiments, as part of grouping events together, the indexing system 112 can generate one or more inverted indexes for a particular group of events. A non-limiting example of an inverted index is described herein with reference to FIG. 3C. In certain embodiments, the inverted indexes can include location information for events of a bucket. For example, the events of a bucket may be compressed into one or more files to reduce their size. The inverted index can include location information indicating the particular file and/or location within a particular file of a particular event.

In certain embodiments, the inverted indexes may include keyword entries or entries for field values or field name-value pairs found in events. In some cases, a field name-value pair can include a pair of words connected by a symbol, such as an equals sign or colon. The entries can also include location information for events that include the keyword, field value, or field value pair. In this way, relevant events can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system can populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 can use the sourcetype of the event to determine which regex to use for identifying field values.

Figure 3C:
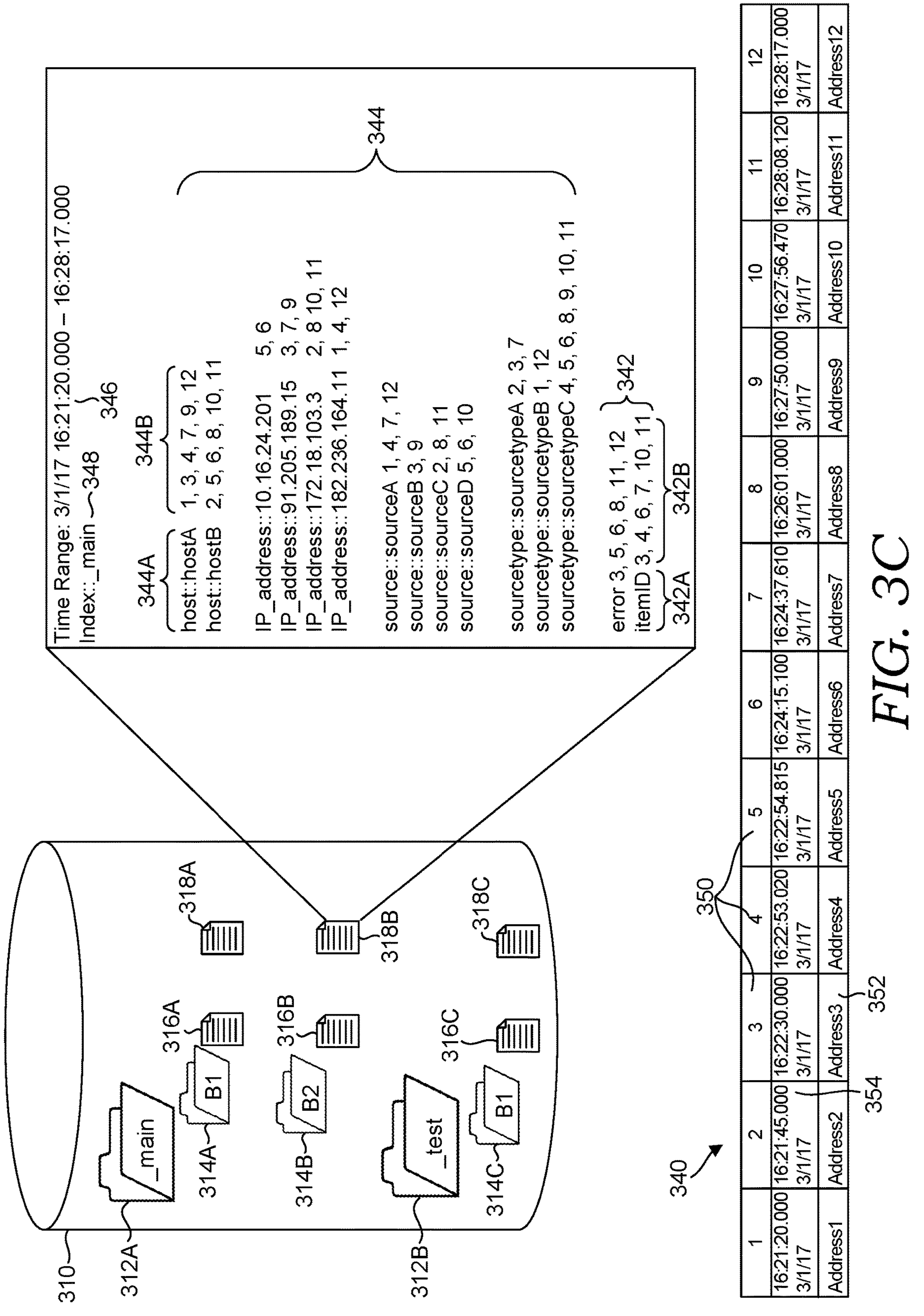

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

The indexing system 112 may be responsible for storing the events in the storage system 116. As mentioned, the events or buckets can be stored locally on a component of the indexing system 112 or in a shared storage system 116. In certain embodiments, the component that generates the events and/or stores the events (indexing node) can also be assigned to search the events. In some embodiments separate components can be used for generating and storing events (indexing node) and for searching the events (search node).

By storing events in a distributed manner (either by storing the events at different components or in a shared storage system 116), the query system 114 can analyze events for a query in parallel. For example, using map-reduce techniques, multiple components of the query system (e.g., indexing or search nodes) can concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket can correspond to a file system directory, and the machine data, or events, of a bucket can be stored in one or more files of the file system directory. The file system directory can include additional files, such as one or more inverted indexes, high-performance indexes, permissions files, configuration files, etc.

In embodiments where components of the indexing system 112 store buckets locally, the components can include a home directory and a cold directory. The home directory can store hot buckets and warm buckets, and the cold directory stores cold buckets. A hot bucket can refer to a bucket that is capable of receiving and storing additional events. A warm bucket can refer to a bucket that can no longer receive events for storage, but has not yet been moved to the cold directory. A cold bucket can refer to a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets can be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data can correspond to data from one or more host devices 104 or data sources. As mentioned, the data source can correspond to a log file, data stream, or other data structure that is accessible by a host device 104. In the illustrated embodiment of FIG. 3A, the machine data has different forms. For example, the machine data 302 may be log data that is unstructured or that does not have any clear structure or fields, and may include different portions of 302A-302E that correspond to different entries of the log and that are separated by boundaries. Such data may also be referred to as raw machine data.

The machine data 304 may be referred to as structured or semi-structured machine data, as it does include some data in a JavaScript Object Notation (JSON) structure defining certain fields and field values (e.g., machine data 304A showing field name: field values container_name:kube-apiserver, host:ip 172 20 43 173.ec2.internal, pod_id: 0a73017b-4efa-11e8-a4e1-0a2bf2ab4bba, etc.), but other parts of the machine data 304 are unstructured or raw machine data (e.g., machine data 304B). The machine data 306 may be referred to as structured data, as it includes particular rows and columns of data with field names and field values.

In some embodiments, the machine data 302 can correspond to log data generated by a host device 104 configured as an Apache server, the machine data 304 can correspond to log data generated by a host device 104 in a shared computing resource environment, and the machine data 306 can correspond to metrics data. Given the differences between host devices 104 that generated the log data 302 and 304, the form of the log data 302 and 304 is different. In addition, as the log data 304 is from a host device 104 in a shared computing resource environment, it can include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes can be received separately and/or found in different data sources and/or host devices 104.

As described herein, the system 102 can process the machine data based on the form in which it is received. In some cases, the intake system 110 can utilize one or more rules to process the data. In certain embodiments, the intake system 110 can enrich the received data. For example, the intake system may add one or more fields to the data received from the host devices 104, such as fields denoting the host, source, sourcetype, index, or tenant associated with the incoming data. In certain embodiments, the intake system 110 can perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 can be communicated or made available to the indexing system 112, the query system 114, and/or to other systems. In some embodiments, the intake system 110 communicates or makes available streams of data using one or more shards. For example, the indexing system 112 may read or receive data from one shard, and another system may receive data from another shard. As another example, multiple systems may receive data from the same shard.

As used herein, a partition can refer to a logical division of data. In some cases, the logical division of data may refer to a portion of a data stream, such as a shard from the intake system 110. In certain cases, the logical division of data can refer to an index or other portion of data stored in the storage system 116, such as different directories or file structures used to store data or buckets. Accordingly, it will be understood that the logical division of data referenced by the term "partition" will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data can be stored in a compressed or encrypted format. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

In the illustrated embodiment of FIG. 3B the data store 310 includes a directory 312 (individually referred to as 312A and 312B) for each index (or partition) that contains a portion of data stored in the data store 310 and a sub-directory 314 (individually referred to as 314A, 314B, and 314C) for one or more buckets of the index. In the illustrated embodiment of FIG. 3B, each sub-directory 314 corresponds to a bucket and includes an event data file 316 (individually referred to as 316A, 316B, and 316C) and an inverted index 318 (individually referred to as 318A, 318B, and 318C). However, it will be understood that each bucket can be associated with fewer or more files and each sub-directory 314 can store fewer or more files.

In the illustrated embodiment, the data store 310 includes a _main directory 312A associated with an index "_main" and a _test directory 312B associated with an index "_test." However, the data store 310 can include fewer or more directories. In some embodiments, multiple indexes can share a single directory or all indexes can share a common directory. Additionally, although illustrated as a single data store 310, it will be understood that the data store 310 can be implemented as multiple data stores storing different portions of the information shown in FIG. 3C. For example, a single index can span multiple directories or multiple data stores.

Furthermore, although not illustrated in FIG. 3B, it will be understood that, in some embodiments, the data store 310 can include directories for each tenant and sub-directories for each index of each tenant, or vice versa. Accordingly, the directories 312A and 312B can, in certain embodiments, correspond to sub-directories of a tenant or include sub-directories for different tenants.

In the illustrated embodiment of FIG. 3B, two sub-directories 314A and 314B of the main directory 312A and one sub-directory 312C of the _test directory 312B are shown. The sub-directories 314A, 314B, and 314C can correspond to buckets of the indexes associated with the directories 312A and 312B. For example, the sub-directories 314A and 314B can correspond to buckets "B1" and "B2," respectively, of the index "_main" and the sub-directory 314C can correspond to bucket "B1" of the index "_test." Accordingly, even though there are two "B1" buckets shown, as each "B1" bucket is associated with a different index (and corresponding directory 312), the system 102 can uniquely identify them.

Although illustrated as buckets "B1" and "B2," it will be understood that the buckets (and/or corresponding sub-directories 314) can be named in a variety of ways. In certain embodiments, the bucket (or sub-directory) names can include information about the bucket. For example, the bucket name can include the name of the index with which the bucket is associated, a time range of the bucket, etc.

As described herein, each bucket can have one or more files associated with it, including, but not limited to, one or more raw machine data files, bucket summary files, filter files, inverted indexes (also referred to herein as high-performance indexes or keyword indexes), permissions files, configuration files, etc. In the illustrated embodiment of FIG. 3B, the files associated with a particular bucket can be stored in the sub-directory corresponding to the particular bucket. Accordingly, the files stored in the sub-directory 314A can correspond to or be associated with bucket "B1" of index "_main," the files stored in the sub-directory 314B can correspond to or be associated with bucket "B2" of index "_main," and the files stored in the sub-directory 314C can correspond to or be associated with bucket "B1" of index "_test."

FIG. 3B further illustrates an expanded event data file 316C showing an example of data that can be stored therein. In the illustrated embodiment, four events 320, 322, 324, and 326 of the machine data file 316C are shown in four rows. Each event 320-326 includes machine data 330 and a timestamp 332. The machine data 330 can correspond to the machine data received by the system 102. For example, in the illustrated embodiment, the machine data 330 of events 320, 322, 324, and 326 corresponds to portions 302A, 302B, 302C, and 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata can be extracted from the corresponding machine data, or supplied or defined by an entity, such as a user or computer system. The metadata fields 334-338 can become part of, stored with, or otherwise associated with the events 320-326. In certain embodiments, the metadata 334-338 can be stored in a separate file of the sub-directory 314C and associated with the machine data file 316C. In some cases, while the timestamp 332 can be extracted from the raw data of each event, the values for the other metadata fields may be determined by the indexing system 112 based on information it receives pertaining to the host device 104 or data source of the data separate from the machine data.

While certain default or user-defined metadata fields can be extracted from the machine data for indexing purposes, the machine data within an event can be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g., extraneous information, confidential information, etc.), all the raw machine data contained in an event can be preserved and saved in its original form. Accordingly, the data store in which the event records are stored is sometimes referred to as a "raw record data store." The raw record data store contains a record of the raw event data tagged with the various fields.

In other embodiments, the portion of machine data in an event can be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events, or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log can include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the GIF file requested by the client), and the time spent 1146 to serve the request in microseconds. In the illustrated embodiments of FIGS. 3A and 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 can be preserved and stored as part of the event 326.

Saving minimally processed or unprocessed machine data in a data store associated with metadata fields in the manner similar to that shown in FIG. 3B is advantageous because it allows a search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data-ingestion time. As a user learns more about the data in the events, the user can continue to refine the late-binding schema by defining new extraction rules, or modifying or deleting existing extraction rules used by the system.

FIG. 3C illustrates an embodiment of another file that can be included in one or more sub-directories 314 or buckets. Specifically, FIG. 3C illustrates an exploded view of an embodiment of an inverted index 318B in the sub-directory 314B, associated with bucket "B2" of the index "main," as well as an event reference array 340 associated with the inverted index 318B.

In some embodiments, the inverted indexes 318 can correspond to distinct time-series buckets. As such, each inverted index 318 can correspond to a particular range of time for an index. In the illustrated embodiment of FIG. 3C, the inverted indexes 318A and 318B correspond to the buckets "B1" and "B2," respectively, of the index "_main," and the inverted index 318C corresponds to the bucket "B1" of the index "_test." In some embodiments, an inverted index 318 can correspond to multiple time-series buckets (e.g., can include information related to multiple buckets) or inverted indexes 318 can correspond to a single time-series bucket.

Each inverted index 318 can include one or more entries, such as keyword (or token) entries 342 or field-value pair entries 344. Furthermore, in certain embodiments, the inverted indexes 318 can include additional information, such as a time range 346 associated with the inverted index or an index identifier 348 identifying the index associated with the inverted index 318. It will be understood that each inverted index 318 can include less or more information than depicted. For example, in some cases, the inverted indexes 318 may omit a time range 346 and/or index identifier 348. In some such embodiments, the index associated with the inverted index 318 can be determined based on the location (e.g., directory 312) of the inverted index 318 and/or the time range of the inverted index 318 can be determined based on the name of the sub-directory 314.

Token entries, such as token entries 342 illustrated in inverted index 318B, can include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "main."

In some cases, some token entries can be default entries, automatically determined entries, or user-specified entries. In some embodiments, the indexing system 112 can identify each word or string in an event as a distinct token and generate a token entry for the identified word or string. In some cases, the indexing system 112 can identify the beginning and ending of tokens based on punctuation, spaces, etc. In certain cases, the indexing system 112 can rely on user input or a configuration file to identify tokens for token entries 342, etc. It will be understood that any combination of token entries can be included as a default, automatically determined, or included based on user-specified criteria.

Similarly, field-value pair entries, such as field-value pair entries 344 shown in inverted index 318B, can include a field-value pair 344A and event references 344B indicative of events that include a field value that corresponds to the field-value pair (or the field-value pair). For example, for a field-value pair sourcetype::sendmail, a field-value pair entry 344 can include the field-value pair "sourcetype::sendmail" and a unique identifier, or event reference, for each event stored in the corresponding time-series bucket that includes a sourcetype "sendmail."

In some cases, the field-value pair entries 344 can be default entries, automatically determined entries, or user-specified entries. As a non-limiting example, the field-value pair entries for the fields "host," "source," and "sourcetype" can be included in the inverted indexes 318 as a default. As such, all of the inverted indexes 318 can include field-value pair entries for the fields "host," "source," and "sourcetype." As yet another non-limiting example, the field-value pair entries for the field "IP_address" can be user-specified and may only appear in the inverted index 318B or the inverted indexes 318A and 318B of the index "_main" based on user-specified criteria. As another non-limiting example, as the indexing system 112 indexes the events, it can automatically identify field-value pairs and create field-value pair entries 344. For example, based on the indexing system's 212 review of events, it can identify IP_address as a field in each event and add the IP_address field-value pair entries to the inverted index 318B (e.g., based on punctuation, like two keywords separated by an '=' or ":" etc.). It will be understood that any combination of field-value pair entries can be included as a default, automatically determined, or included based on user-specified criteria.

With reference to the event reference array 340, each unique identifier 350, or event reference, can correspond to a unique event located in the time series bucket or machine data file 316B. The same event reference can be located in multiple entries of an inverted index 318. For example, if an event has a sourcetype "splunkd," host "www1" and token "warning," then the unique identifier for the event can appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 can be used to locate the events in the corresponding bucket or machine data file 316. For example, the inverted index 318B can include, or be associated with, an event reference array 340. The event reference array 340 can include an array entry 350 for each event reference in the inverted index 318B. Each array entry 350 can include location information 352 of the event corresponding to the unique identifier (non-limiting examples: seek address of the event, physical address, slice ID, etc.), a timestamp 354 associated with the event, or additional information regarding the event associated with the event reference, etc.

For each token entry 342 or field-value pair entry 344, the event reference 342B and 344B, respectively, or unique identifiers can be listed in chronological order, or the value of the event reference can be assigned based on chronological data, such as a timestamp associated with the event referenced by the event reference. For example, the event reference 1 in the illustrated embodiment of FIG. 3C can correspond to the first-in-time event for the bucket, and the event reference 12 can correspond to the last-in-time event for the bucket. However, the event references can be listed in any order, such as reverse chronological order, ascending order, descending order, or some other order (e.g., based on time received or added to the machine data file), etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 can decrease the search time of a query. For example, for a statistical query, by using the inverted index, the system 102 can avoid the computational overhead of parsing individual events in a machine data file 316. Instead, the system 102 can use the inverted index 318 separate from the raw record data store to generate responses to the received queries.

3.0. Query Processing and Execution

Figure 4A:
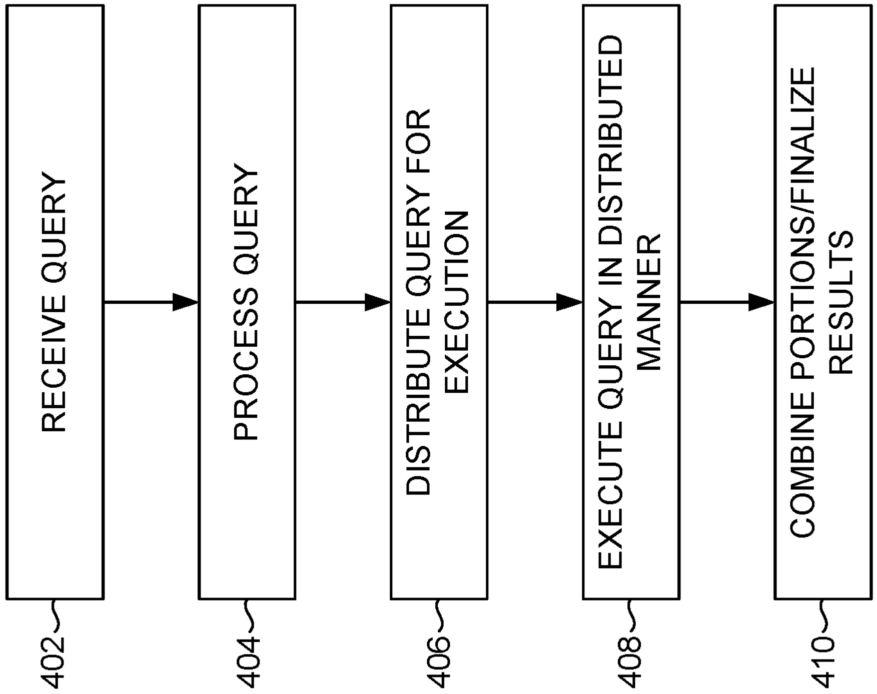
FIG. 4A is a flow diagram illustrating an embodiment of a routine implemented by the query system to execute a query.

FIG. 4A is a flow diagram illustrating an embodiment of a routine implemented by the query system 114 for executing a query. At block 402, the query system 114 receives a search query. As described herein, the query can be in the form of a pipelined command language or other query language and include filter criteria used to identify a set of data and processing criteria used to process the set of data.

At block 404, the query system 114 processes the query. As part of processing the query, the query system 114 can determine whether the query was submitted by an authenticated user and/or review the query to determine that it is in a proper format for the data intake and query system 102, has correct semantics and syntax, etc. In addition, the query system 114 can determine what, if any, configuration files or other configurations to use as part of the query.

In addition, as part of processing the query, the query system 114 can determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 can generate specific commands for the components that are to execute the query. This may include generating sub-queries, partial queries, or different phases of the queries for execution by different components of the query system 114. In some cases, the query system 114 can use map-reduce techniques to determine how to map the data for the search and then reduce the data. Based on the map-reduce phases, the query system 114 can generate query commands for different components of the query system 114.

As part of processing the query, the query system 114 can determine where to obtain the data. For example, in some cases, the data may reside on one or more indexing nodes or search nodes as part of the storage system 116, or may reside in a shared storage system or a system external to the system 102. In some cases, the query system 114 can determine what components to use to obtain and process the data. For example, the query system 114 can identify search nodes that are available for the query, etc.

At block 406, the query system 1206 distributes the determined portions or phases of the query to the appropriate components (e.g., search nodes). In some cases, the query system 1206 can use a catalog to determine which components to use to execute the query (e.g., which components include relevant data and/or are available, etc.).

At block 408, the components assigned to execute the query execute the query. As mentioned, different components may execute different portions of the query. In some cases, multiple components (e.g., multiple search nodes) may execute respective portions of the query concurrently and communicate results of their portion of the query to another component (e.g., search head). As part of identifying the set of data or applying the filter criteria, the components of the query system 114 can search for events that match the criteria specified in the query. These criteria can include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes can send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results can include further processing the data according to the query. Such processing may entail joining different sets of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data, depending on what the query requested. For example, the results can include a listing of matching events returned by the query, or some type of visualization of the data from the returned events. In another example, the final result can include one or more calculated values derived from the matching events.

The results generated by the query system 114 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs," and the client may retrieve the results by referring to the search jobs.

The query system 114 can also perform various operations to make the search more efficient. For example, before the query system 114 begins execution of a query, it can determine a time range for the query and a set of common keywords that all matching events include. The query system 114 may then use these parameters to obtain a superset of the eventual results. Then, during a filtering stage, the query system 114 can perform field-extraction operations on the superset to produce a reduced set of search results. This speeds up queries, which may be particularly helpful for queries that are performed on a periodic basis. In some cases, to make the search more efficient, the query system 114 can use information known about certain data sets that are part of the query to filter other data sets. For example, if an early part of the query includes instructions to obtain data with a particular field, but later commands of the query do not rely on the data with that particular field, the query system 114 can omit the superfluous part of the query from execution.

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can include filter criteria used to search or filter for specific data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|." In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms or filter criteria at the beginning of the pipeline. Such search terms or filter criteria can include any combination of keywords, phrases, times, dates, Boolean expressions, field name-field value pairs, etc., that specify which results should be obtained from different locations. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create a summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g., calculation of an aggregate value related to the filtered events such as the average response time of servers with response times of less than 1 microsecond). Furthermore, the search command can allow events to be filtered by keyword as well as field criteria. For example, a search command can filter events based on the word "warning" or filter events based on a field value "10.0.1.2" associated with a field "clientip."

The results obtained or generated in response to a command in a query can be considered a set of results data. The set of results data can be passed from one command to another in any data format. In one embodiment, the set of results data can be in the form of a dynamically created table. Each command in a particular query can redefine the shape of the table. In some implementations, an event retrieved from an index in response to a query can be considered a row with a column for each field value. Columns can contain basic information about the data and/or data that has been dynamically extracted at search time.

Figure 4B:
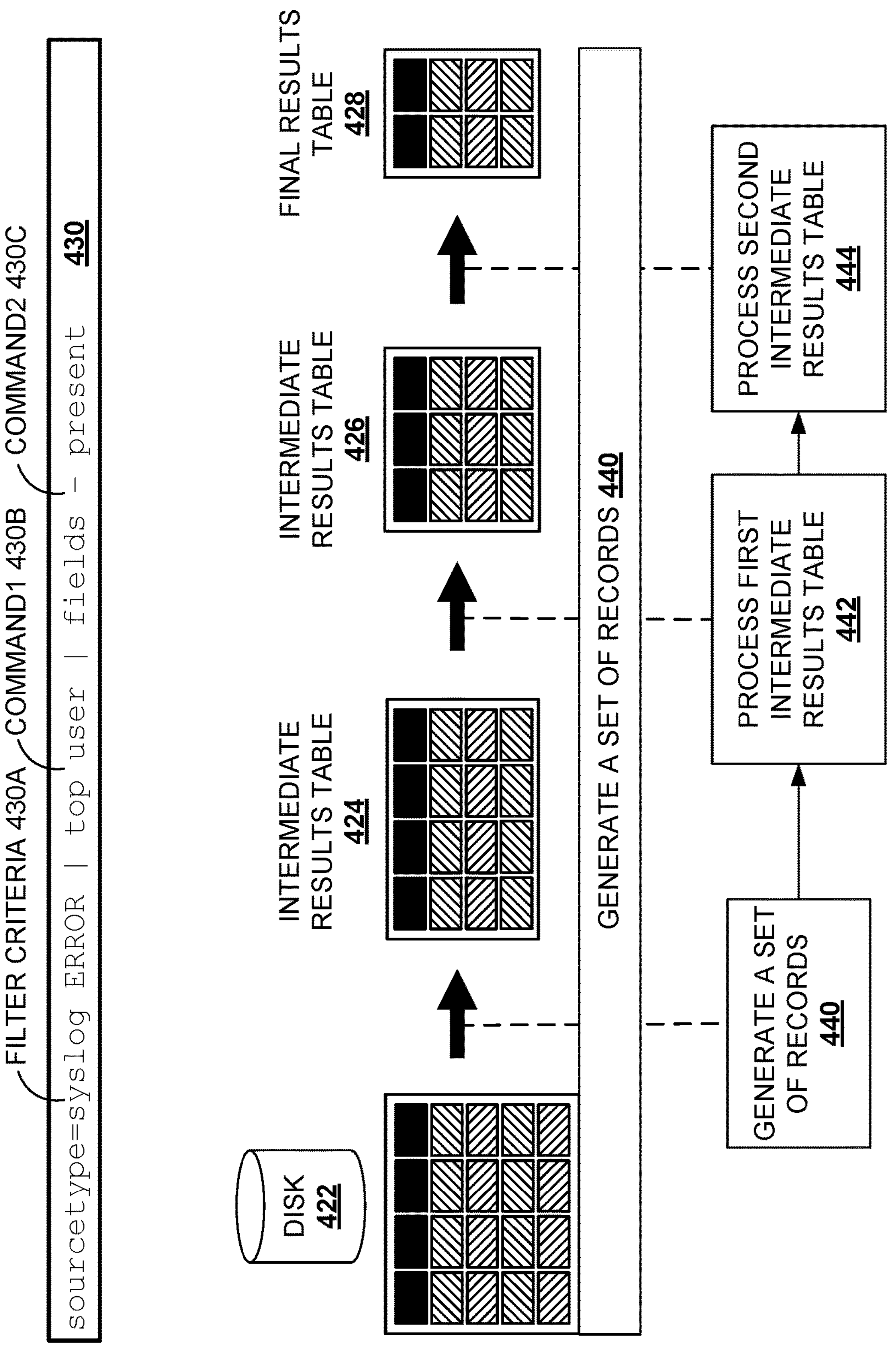
FIG. 4B provides a visual representation of the manner in which a pipelined command language or query can operate

FIG. 4B provides a visual representation of the manner in which a pipelined command language or query can operate in accordance with the disclosed embodiments. The query 430 can be input by the user and submitted to the query system 114. In the illustrated embodiment, the query 430 comprises filter criteria 430A, followed by two commands 430B and 430C (namely, Command 1 and Command 2). Disk 422 represents data as it is stored in a data store to be searched. For example, disk 422 can represent a portion of the storage system 116 or some other data store that can be searched by the query system 114. Individual rows can represent different events and columns can represent different fields for the different events. In some cases, these fields can include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 can execute the filter criteria 430A portion of the query 430 before executing Command 1 or Command 2.

Rows in the table 424 may represent individual records, where each record corresponds to an event in the disk 422 that satisfies the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that can be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 match the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command 1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 can represent a record that includes a unique field value for the field "user," and each column can represent a field for that record, such as field "user," "count," and "percentage."

At block 444, the query system 114 processes the second intermediate results table 426 to generate the final results table 428. With reference to query 430, the query system 114 applies the command "fields-present" to the second intermediate results table 426 to generate the final results table 428. As shown, the command "fields-present" of the query 430 results in one less column, which may represent that a field was removed during processing. For example, the query system 114 may have determined that the field "percentage" was unnecessary for displaying the results based on the Command 2. In such a scenario, each record of the final results table 428 would include a field "user" and "count." Further, the records in the table 428 would be ordered from largest count to smallest count based on the query commands.

It will be understood that the final results table 428 can be a third intermediate results table, which can be pipelined to another stage where further filtering or processing of the data can be performed, e.g., preparing the data for display purposes, filtering the data based on a condition, performing a mathematical calculation with the data, etc. In different embodiments, other query languages, such as the Structured Query Language ("SQL"), can be used to create a query.

As described herein, extraction rules can be used to extract field-value pairs or field values from data. An extraction rule can comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules can be used to extract one or more values for a field from events by parsing the portions of machine data in the events and examining the data for one or more patterns of characters, numbers, delimiters, etc., that indicate where the field begins and, optionally, ends. In certain embodiments, extraction rules can be stored in one or more configuration files. In some cases, a query itself can specify one or more extraction rules.

In some cases, extraction rules can be applied at data ingest by the intake system 110 and/or indexing system 112. For example, the intake system 110 and indexing system 112 can apply extraction rules to ingested data and/or events generated from the ingested data and store results in an inverted index.

The system 102 advantageously allows for search time field extraction. In other words, fields can be extracted from the event data at search time using late-binding schema as opposed to at data-ingestion time, which was a major limitation of the prior art systems. Accordingly, extraction rules can be applied at search time by the query system 114. The query system can apply extraction rules to events retrieved from the storage system 116 or data received from sources external to the system 102. Extraction rules can be applied to all the events in the storage system 116 or to a subset of the events that have been filtered based on some filter criteria (e.g., event timestamp values, etc.).

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store can store millions of events. FIG. 4C also illustrates an embodiment of a search bar 450 for entering a query and a configuration file 452 that includes various extraction rules that can be applied to the events 320-326.

As a non-limiting example, if a user inputs a query into search bar 450 that includes only keywords (also known as "tokens"), e.g., the keyword "error" or "warning," the query system 114 can search for those keywords directly in the events 320-326 stored in the raw record data store.

As described herein, the indexing system 112 can optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 can search the events 320-326 directly and return the first event 320. In the case where the keyword has been indexed, the inverted index can include a reference pointer that will allow for a more efficient retrieval of the event data from the data store. If the keyword has not been indexed, the query system 114 can search through the events in the event data file to service the search.

In many cases, a query includes fields. The term "field" refers to a location in the event data containing one or more values for a specific data item. Often, a field is a value with a fixed, delimited position on a line, or a name and value pair, where there is a single value to each field name. A field can also be multivalued—that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs, such as "user_name=Bob." But in most cases, field values appear in fixed, delimited positions without identifying keys. For example, the data store may contain events where the "user_name" value always appears by itself after the timestamp, as illustrated by the following string: "November 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules can comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system can then generate a regular expression that extracts those fields from similar events and store the regular expression as an extraction rule for the associated field in the configuration file 452.

In some embodiments, the indexing system 112 can automatically discover certain custom fields at index time, and the regular expressions for those fields will be automatically generated at index time and stored as part of the extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 can specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events can have its own corresponding extraction rule in the configuration file 452, and each of the extraction rules would comprise a different regular expression to parse out the associated field value. In some cases, the sets of events are grouped by sourcetype because events generated by a particular source can have the same format.

The field extraction rules stored in configuration file 452 can be used to perform search-time field extractions. For example, for a query that requests a list of events with sourcetype "access combined" where the "clientip" field equals "127.0.0.1," the query system 114 can locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, and 324, the query system 114 can then apply the field criteria by performing a compare operation to filter out events where the "clientip" field does not equal "127.0.0.1." In the example shown in FIG. 4C, the events 320 and 322 would be returned in response to the user query. In this manner, the query system 114 can service queries with filter criteria containing field criteria and/or keyword criteria.

It should also be noted that any events filtered by performing a search-time field extraction using a configuration file 452 can be further processed by directing the results of the filtering step to a processing step using a pipelined search language. Using the prior example, a user can pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field-searchable. In other words, the raw record data store can be searched using keywords as well as fields, wherein the fields are searchable name-value pairings that can distinguish one event from another event and can be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user can create new fields at search time and simply add field definitions to the configuration file 452. As a user learns more about the data in the events, the user can continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data-ingestion time. Similarly, multiple field definitions can be added to the configuration file to capture the same field across events generated by different sources or sourcetypes. This allows the system 102 to search and correlate data across heterogeneous sources flexibly and efficiently.

The system 102 can use one or more data models to search and/or better understand data. A data model is a hierarchically structured search-time mapping of semantic knowledge about one or more datasets. It encodes the domain knowledge used to build a variety of specialized searches of those datasets. Those searches, in turn, can be used to generate reports.

The above-described system provides significant flexibility by enabling a user to analyze massive quantities of minimally processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time can involve a large amount of data and require a large number of computational operations, which can cause delays in processing the queries. In some embodiments, the system 102 can employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query can be structured such that multiple components of the query system 114 (e.g., search nodes) perform the query in parallel, while aggregation of search results from the multiple components is performed at a particular component (e.g., search head). For example, consider a scenario in which a user enters the query "Search "error" | stats count BY host." The query system 114 can identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 can generate commands to be executed in parallel by the search nodes, with each search node applying the generated commands to a subset of the data to be searched. In this example, the query system 114 generates and then distributes the following commands to the individual search nodes: "Search "error" | prestats count BY host." In this example, the "prestats" command can indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 can employ a variety of techniques to use distributed components to execute a query. In some embodiments, the query system 114 can use distributed components for only mapping functions of a query (e.g., gather data, applying filter criteria, etc.). In certain embodiments, the query system 114 can use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system's 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102, as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data-ingestion time, wherein the extracted data is typically stored in a relational database. This data extraction process and associated reduction in data content that occurs at data-ingestion time inevitably hampers future investigations, when all of the original data may be needed to determine the root cause of or contributing factors to a service issue.

In contrast, an IT monitoring application system stores large volumes of minimally-processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertain to the entity, whether produced by the entity itself or by another machine, and considering the many various ways the entity may be identified in machine data (such as by a URL, an IP address, or machine name). The service and entity definitions can organize events around a service so that all of the events pertaining to that service can be easily identified. This capability provides a foundation for the implementation of Key Performance Indicators.

As described herein, the system 102 can receive heterogeneous data from disparate systems. In some cases, the data from the disparate systems may be related, and correlating the data can result in insights into client or customer interactions with various systems of a vendor. To aid in the correlation of data across different systems, multiple field definitions can be added to one or more configuration files to capture the same field or data across events generated by different sources or sourcetypes. This can enable the system 102 to search and correlate data across heterogeneous sources flexibly and efficiently.

Figure 4D:
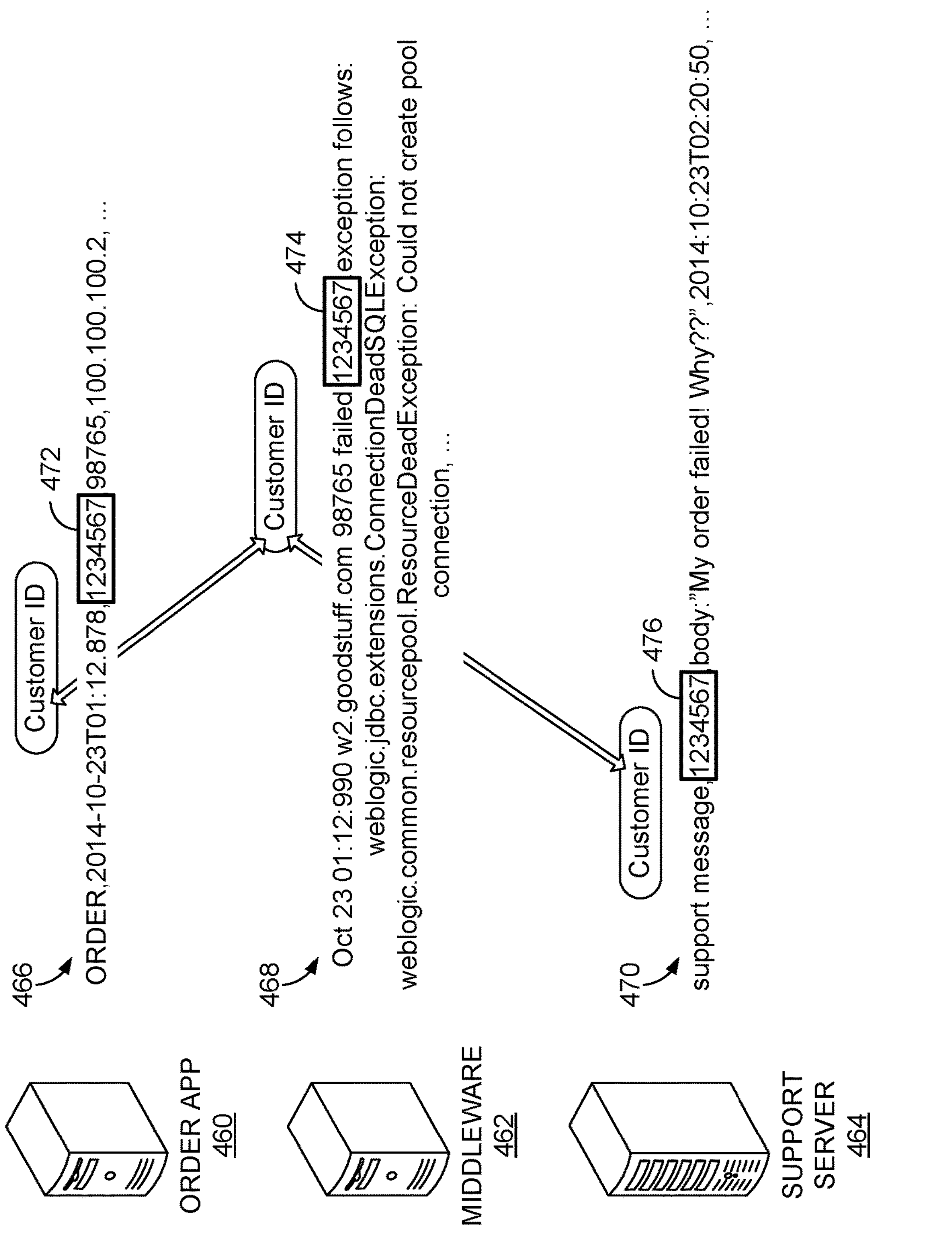
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, and 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, and 464, the vendor can uniquely obtain an insight into user activity, user experience, and system behavior. The system 102 allows the vendor's administrator to search the log data from the three systems 460, 462, and 464, thereby obtaining correlated information, such as the order number and corresponding customer ID number of the person placing the order. The system 102 also allows the administrator to see a visualization of related events via a user interface. The administrator can query the system 102 for customer ID field value matches across the log data from the three systems 460, 462, and 464 that are stored in the storage system 116. While the customer ID field value exists in the data gathered from the three systems 460, 462, and 464, it may be located in different areas of the data given differences in the architecture of the systems. The query system 114 obtains events from the storage system 116 related to the three systems 460, 462, and 464. The query system 114 then applies extraction rules to the events in order to extract field values for the field "customer ID" that it can correlate. As described herein, the query system 114 may apply a different extraction rule to each set of events from each system when the event format differs among systems. In this example, a user interface can display to the administrator the events corresponding to the common customer ID field values 472, 474, and 476, thereby providing the administrator with insight into a customer's experience. The system 102 can provide additional user interfaces and reports to aid a user in analyzing the data associated with the customer.

5.0. Facilitating Highly Anomalous Data Detection

Software tools exist to enable or facilitate the storage, indexing, and searching of massive quantities of data. Analytics, such as cybersecurity analytics (e.g., including but not limited to computer network security), is one of many applications of such tools. For example, a software tool in the form of a data intake and query system (DIQS) may ingest, index, and store machine-generated data from various sources on a computer network. Such a system may be used in conjunction with an analytics service that applies various rules and/or algorithms to identify actual or potential security-related anomalies and threats from network data ingested by the DIQS. The analytics service, or component associated therewith, may provide a graphical user interface (GUI) that enables an analyst, such as a cybersecurity analyst, to monitor the status of the analyses (e.g., security-related analyses) and to define and view results, for example, associated with cybersecurity-related searches of the ingested data.

An analytics service may include analytic algorithms to analyze data. Analytics can be used to perform various types of analysis. For example, analytics may be used to perform cybersecurity-related analysis on data. In this way, data may be analyzed via analytic algorithms to detect anomalies and/or threats. In some cases, data analysis may be performed to identify highly anomalous data. Highly anomalous data refers to data that is significantly different or deviates greatly from the norm or expected behavior. Stated differently, highly anomalous data describes events or observations that are rare, atypical, or unexpected in comparison to the surrounding or anticipated circumstances or patterns. Highly anomalous data may also be referred to as extreme values.

Conventional approaches to identify anomalies include utilization of a z-score, a modified z-score, and an interquartile range (IQR). Z-score generally measures a number of standard deviations a data value is from a distribution mean. When the data value is over a number of standard deviations (e.g., three standard deviations), the data value is generally identified as an anomaly or outlier. With modified z-scores, the median and a Median Absolute Deviation (MAD) is used to identify anomalies. With IQU, the interquartile range is between the first quartile and the third quartile of a distribution. Data beyond the interquartile range for a multiplier of IQR (e.g., 1.5) are generally identified as outliers.

Such approaches, however, may be deficient in identifying highly anomalous data. For example, in some cases, z-score analysis may assume a normal distribution. In cases in which a data value deviates significantly from normality, the z-score may not accurately represent extremity of the data value. Further, z-scores may be sensitive to anomalies in a dataset. In this regard, a highly anomalous data value may significantly impact a mean and standard deviation used in determining a z-score, which may lead to inaccurate results. With regard to IQR, this approach may not consider the tail behavior of a distribution. As such, highly anomalous data or the extremity of such data, particularly in the tails of a distribution, may not be recognized. Accordingly, for these and other reasons, such approaches may not accurately identify highly anomalous data.

Inaccurate identification of highly anomalous data can result in compromised decision-making and inefficient utilization of computing resources. For example, assume highly anomalous data is identified and communicated as such when the data value is not highly anomalous and/or does not result in suspicious or threatening behavior. In such a case, computing resources may be unnecessarily utilized to communicate such information and to perform additional data analysis resulting from the misrepresented data. Moreover, frequent communication of misrepresented data may cause alert fatigue, which may result in overlooking subsequent suspicious or threatening behavior. As another example, assume highly anomalous data is not appropriately recognized. In such a case, a suspicious or threatening behavior may be not be recognized, thereby compromising security of computing resources as well as causing unnecessary utilization of computing resources to respond to a cybersecurity attack. As such, computing resources are unnecessarily utilized in association with inaccurate identification of highly anomalous data. Further, unnecessary computing resource utilization is exacerbated as inaccurate identification of highly anomalous data increases.

Accordingly, embodiments described herein are directed to facilitating efficient and effective detection of highly anomalous data. In particular, embodiments discussed herein operate in a manner that accurately identifies highly anomalous data, thereby reducing utilization of computing resources otherwise used to account for or respond to inaccurately identified highly anomalous data. Such efficient and effective detection of highly anomalous data may be implemented in an analytics service, such as a cybersecurity analytics service. In this regard, highly anomalous data may be accurately identified to facilitate detection of security-related anomalies or threats. Although embodiments described herein include examples related to detection of highly anomalous data related to security, embodiments are not intended to be limited thereto.

In operation, to effectively detect highly anomalous data in an efficient manner, a highly anomalous threshold is generated. A highly anomalous threshold is generally used to identify whether a data value is highly anomalous. For example, a data value greater than the highly anomalous threshold may be identified or designated as highly anomalous. To generate a highly anomalous threshold, embodiments described herein utilize an extreme value distribution. In particular, an extreme value distribution is generated that represents maximum or high values associated with a dataset, such as a time-series dataset. By way of example, a time-series dataset may be generated that includes aggregated data associated with a desired feature for a series of time windows. For example, assume a desired feature to evaluate for highly anomalous data is login failures and a time window is defined as one hour. In such a case, a time-series dataset may be generated that includes a set of total number of login failures that occur within a series of one-hour time increments. The time-series dataset may then be used to identify maximum values to use for generating an extreme value distribution. The manner in which to select maximum values may vary, for example, based on data sparsity. In accordance with reviewing a distribution based on the maximum values, the generalized extreme value distribution may be used to identify a highly anomalous threshold.

Upon determining the highly anomalous threshold, the threshold may be used to identify highly anomalous data.

For example, data values may be compared to the highly anomalous threshold. For any data values that are greater than the highly anomalous threshold, such data may be deemed or designated as highly anomalous. As can be appreciated, such an effective and efficient determination of a highly anomalous threshold and detection of highly anomalous data reduces computing resource utilization.

Advantageously, generating a highly anomalous threshold and/or identifying highly anomalous data may be performed in a manner that is effective for a desired analysis. For instance, various highly anomalous attributes may be obtained and used to generate a highly anomalous threshold and/or identify highly anomalous data based on a desired analysis. Examples of highly anomalous attributes include indications of a desired feature, an indication of a manner in which to aggregate data (e.g., total, average, etc.), a time window to use for aggregating data, and/or the like. In some implementations, such highly anomalous attributes may be specified in a configuration file associated with a particular anomaly detection use case for analyzing data. For example, a first configuration file associated with login failures may include a first set of anomalous attributes, and a second configuration file associated with password sprays may include a second set of anomalous attributes. Various anomaly detection use cases include, for example, failed logins, password spray, data exfiltration, insider threat (e.g., internal data downloading), kerberoasting, ransomware, bitcoin mining, resource destroying (e.g., high rate of destroying resources), access key creation (e.g., high rate of access key creation), security scanning, etc. Such a tailored or customized analysis further facilitates effective and efficient determination of a highly anomalous threshold and detection of highly anomalous data.

Further, in embodiments, contextual analysis may be performed to identify anomaly context, for example, to provide context to data identified as highly anomalous. In particular, although a data value may be identified as highly anomalous, in some cases, the data value may not be suspicious or threatening. Accordingly, additional analysis may be applied to identify any context associated with the data value. The anomaly context identified may be based on the particular use case for analyzing data. For example, one set of contextual information may be determined in association with identifying login failures, while another set of contextual information may be determined in association with identifying password sprays. In some cases, the anomaly context may be used to adjust or modify an anomaly score. The adjusted anomaly score may be used to determine whether to provide a highly anomalous alert to a user (e.g., a score above a threshold may result in alerting the user, while a score below the threshold may result in not alerting the user). Additionally or alternatively, the anomaly context may be presented to the user (e.g., an analyst). As can be appreciated, providing alerts in association with more suspicious or threatening data results in a more effective notification to a user and more efficient use of computing resources. Further, anomaly context provides relevant information to a user, thereby reducing computing resource utilization that otherwise may be needed by the user to obtain and analyze the data.

Figure 5:
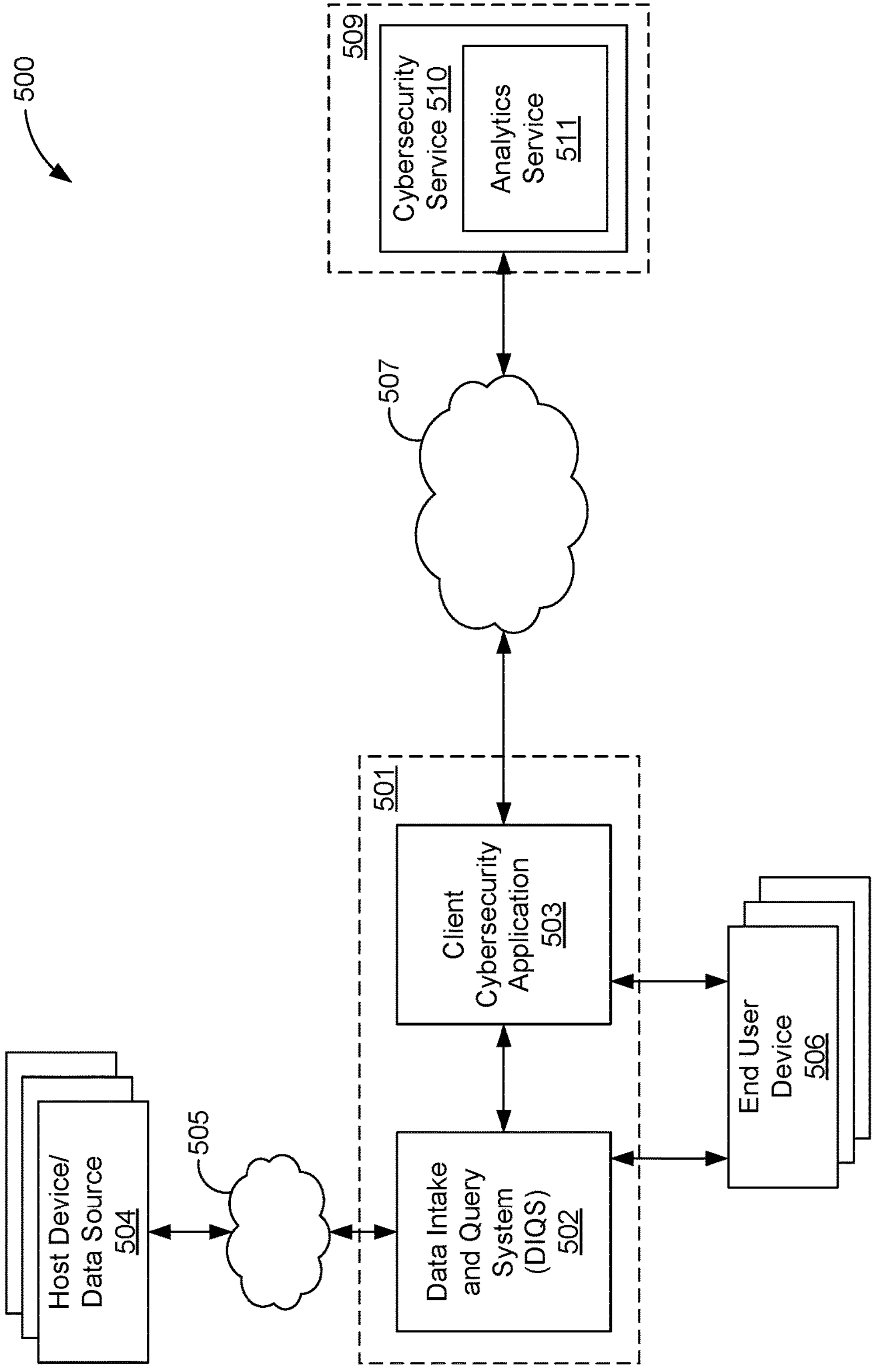
FIG. 5 illustrates an example data-processing environment including an analytics service operating to perform cybersecurity data analysis, in accordance with various embodiments of the present disclosure.

5.1 Overview of Facilitating Highly Anomalous Data Detection in an Analytics Service in a Data-Processing Environment As described, embodiments described herein are directed to facilitating efficient and effective detection of highly anomalous data. In particular, embodiments discussed herein facilitate detection of highly anomalous data and enrichment thereof in an analytics service, such as a cybersecurity analytics service. As described, identifying highly anomalous data in an efficient and effective manner enables reduction of utilization of computing resources, for example, that are otherwise unnecessarily used in cases in which highly anomalous data is inaccurately identified. Generally, an analytics service manages data analytics. One example environment in which an analytics service is deployed is a data-processing environment that includes cybersecurity data analysis. FIG. 5 provides an example data-processing environment, including an analytics service operating to perform cybersecurity data analysis.

In particular, FIG. 5 shows an example of a data-processing environment 500, in which the technique introduced herein can be implemented. In the illustrated embodiment, the environment 500 includes an end-user computer system 501, one or more host devices 504, and one or more end-user devices (also called "client devices" or simply "clients") 506, all coupled to each other by a network 505. The end-user computer system 501 includes a DIQS 502 and a client-side cybersecurity application 503.

The DIQS 502 can ingest, index, and/or store data from heterogeneous data sources and/or host devices 504. For example, the DIQS 502 can ingest, index, and/or store any type of machine data, regardless of the form of the machine data or whether the machine data matches or is similar to other machine data ingested, indexed, and/or stored by the DIQS 502. In some cases, the DIQS 502 can parse the received data into events, group the events, and store the events in buckets. An "event" in this context is a portion of machine data associated with a specific point in time (e.g., by a timestamp). The DIQS 502 can also search heterogeneous data that it has stored or search data stored by other systems (e.g., other DIQS systems or other nonDIQS systems). For example, in response to received queries, the DIQS 502 can assign one or more components to search events stored in the storage system or search data stored elsewhere. An example of a commercially available data intake and query system that can be used to implement the DIQS 502 is SPLUNK® ENTERPRISE, developed by Splunk Inc. of San Francisco, California.

As described in greater detail below, the DIQS 502 can include one or more components (not shown in FIG. 5) to ingest, index, store, and/or search data. In some embodiments, the DIQS 502 is implemented as a distributed system that uses multiple components to perform its various functions. For example, the DIQS 502 can include any one or any combination of an intake system (including one or more components) to ingest data, an indexing system (including one or more components) to index the data, a storage system (including one or more components) to store the data, and/or a query system (including one or more components) to search the data, etc.

Although DIQS 502 is illustrated in an on-premises environment, as can be appreciated DIQS 502 may alternatively be implemented in a cloud environment. For example, some users may prefer a cloud service environment in which the user is not directly responsible for providing and managing the computing devices upon which various components of a DIQS may operate, while other users may prefer an on-premises solution such that data intake and the query system is operated on the user's own computing infrastructure (e.g., to provide a greater level of control over the configuration of certain aspects of the service).

The client-side cybersecurity application 503 can be a software application that runs logically "on top of" or in cooperation with the DIQS 502. An example of such a network cybersecurity application is SPLUNK® ENTERPRISE SECURITY, also developed by Splunk Inc. In at least some embodiments, the client-side cybersecurity application 503 may include a user interface generator to generate a graphical user interface (GUI), a risk-scoring engine to generate risk scores for entities and/or events, and/or a search engine to enable an end user to search data acquired and indexed by the DIQS 502. In at least some embodiments, client devices 506 of the DIQS 502 also are clients of (and therefore have access to) the client-side cybersecurity application 503.

The environment 500 also includes a cloud-based (server-side) computer system 509, which includes a cybersecurity service 510. In some embodiments, the client-side cybersecurity application 503 and the cybersecurity service 510 are components of the same distributed application. In other embodiments, the client-side cybersecurity application 503 and the cybersecurity service 510 are separate applications. Although the cybersecurity service 510 is illustrated herein as being deployed in a cloud-based environment, in some embodiments, the cybersecurity service 510 may be deployed in an on-premises environment.

The cybersecurity service 510 may receive event data from the end-user computer system 501 via the network 507. Such data may be provided directly by the DIQS 502, or it may be provided from the DIQS 502 to the cybersecurity service 510 via the client-side cybersecurity application 503 or another component, which may preprocess some of the data. Although illustrated as event data being communicated via end-user computer system 501, other implementations may be employed. For example, as described, the DIQS may operate in a cloud environment and provide event data to the cloud-based cybersecurity service 510. As another example, event data may be provided via data source 504 or end-user device 506, among other components.

The cybersecurity service 510 may perform various security-related tasks. As one example, cybersecurity service 510 may detect anomalies and/or threats in data. In this regard, the cybersecurity service 510 includes an analytics service 511 used to analyze data and identify such anomalies and threats. In this way, the analytics service 511 may include various analytics, which it applies to the event data received (e.g., from the end-user computer system 501), to evaluate risk levels associated with the event data received. Analysis results identified via the analytics management service 511 may be provided to a user device, such as end user device 506. For example, analysis results may be provided to end user device 506 via the client cybersecurity application 503.

Figure 6:
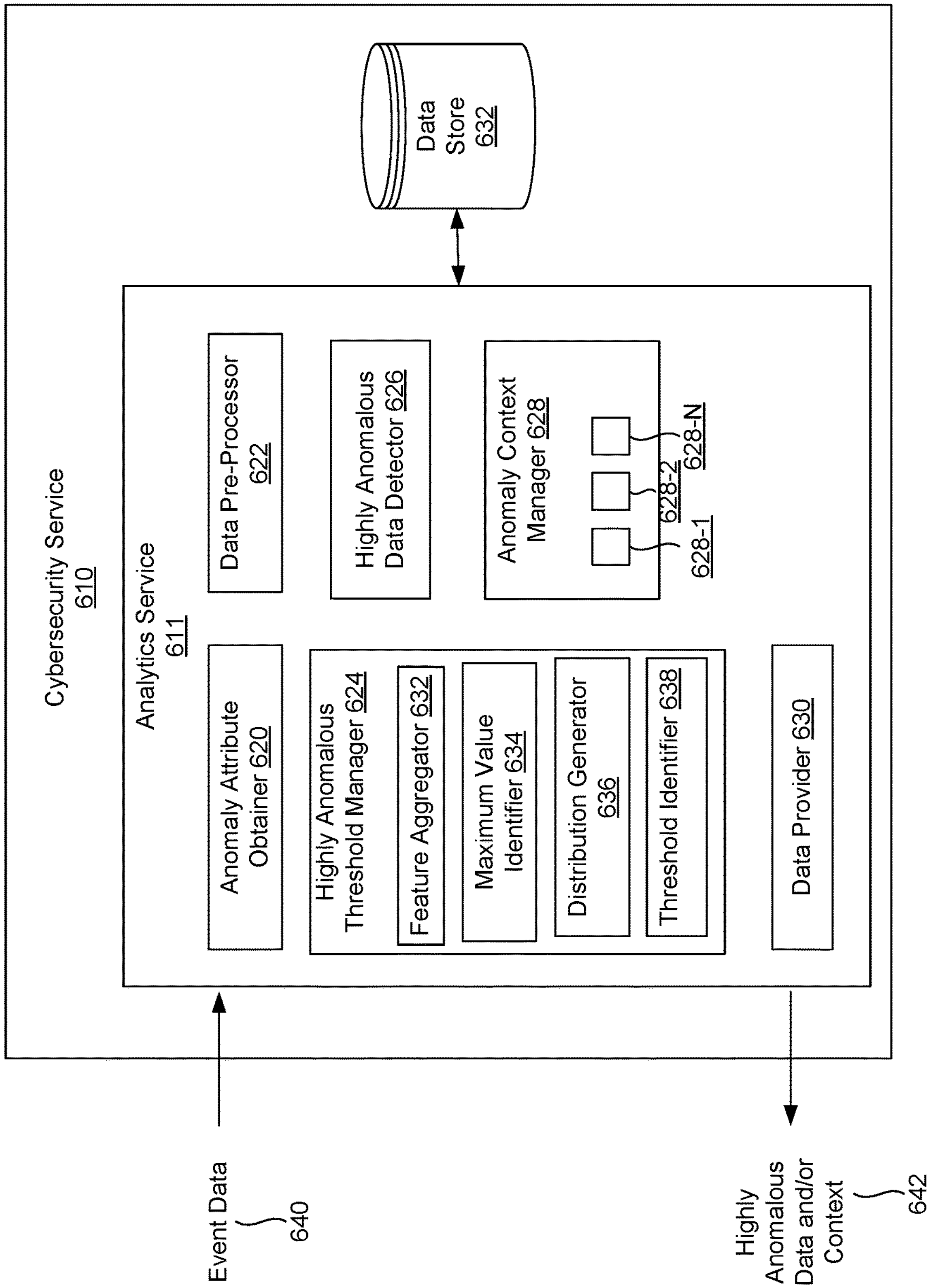
FIG. 6 provides an example of an analytics service in a cybersecurity service operating to perform highly anomalous data detection, in accordance with various embodiments of the present disclosure.

FIG. 6 illustrates an example of an analytics service 611, according to at least one embodiment. As described, the analytics service 611 generally operates to analyze data and identify anomalies and/or threats in an efficient and effective manner. In particular, the analytics service 611 may identify highly anomalous data and/or context associated therewith. Such identified highly anomalous data and/or context associated therewith may be presented to a user or otherwise used to in association with data analysis and security.

In FIG. 6, the analytics service 611 includes an anomaly attribute obtainer 620, a data pre-processor 622, a highly anomalous threshold manager 624, a highly anomalous data detector 626, an anomaly context manager 628, and a data provider 630. At a high level, the highly anomalous threshold manager 624 is configured to identify a highly anomalous threshold, which can then be used by the highly anomalous data detector 626 to detect highly anomalous data. For data identified as highly anomalous, the data context manager 628 may be executed to identify or generate anomaly context associated with such data. The data provider 630 can provide an indication of highly anomalous data and/or context associated therewith, for example, for presentation to a user (e.g., via end user device 506 of FIG. 5). In embodiments, the analytics service 611, or components associated therewith, may access or store data via data store 632. Accordingly, data store 632 may store various types of data, such as, for example, events, anomaly attributes (e.g., configuration files), highly anomalous thresholds, contextual data, etc.

The anomaly attribute obtainer 620 is generally configured to obtain highly anomalous attributes. A highly anomalous attribute generally refers to an attribute or parameter associated with identification of highly anomalous data. In this regard, highly anomalous attributes may be used to indicate a manner in which to identify highly anomalous data. In particular, highly anomalous attributes may indicate a manner in which to generate or determine a highly anomalous threshold, which is subsequently used to identify highly anomalous data. As described, highly anomalous data refers to data that is significantly different or deviates greatly from the norm or expected behavior. Stated differently, highly anomalous data describes events or observations that are rare, atypical, or unexpected in comparison to the surrounding or anticipated circumstances or patterns.

Highly anomalous attributes may be obtained in any of a number of ways. In some cases, highly anomalous attributes are input via a user interface. For example, an analyst may provide highly anomalous attributes for use in identifying highly anomalous data via a graphical user interface. For instance, a user interface may be presented with various attribute options, and a user may select one or more highly anomalous attributes for use in detecting highly anomalous data. In other cases, highly anomalous attributes may be obtained via a configuration file for use in identifying highly anomalous data. For example, a configuration file including various highly anomalous attributes for identifying highly anomalous data may be obtained (e.g., via data store 632). In this regard, the anomaly attribute obtainer 620 can read in a configuration file that includes various highly anomalous attributes.

Highly anomalous attributes (e.g., obtained via a configuration file) may include, among other things, a dataset attribute, a feature attribute, an aggregate attribute, a temporal attribute, a duration attribute, a confidence attribute, a sparsity attribute, etc. A dataset attribute refers to a dataset for which to use in performing highly anomalous data detection. A dataset may be specified in any manner and with any level of granularity. In some cases, a dataset may be indicated via a data source, a timeframe, etc.

A feature attribute refers to a feature for which a time series dataset is generated to identify a highly anomalous threshold for use in detecting highly anomalous data. A feature may be any type of data. In some embodiments, a feature relates to cybersecurity data or analytics. A feature may be of any level of granularity. As one example, a feature may indicate an interest in count of bytes within a network. In another example, a feature may be specified to be a more detailed granularity, such as a count of bytes associated with a particular component or set of components. As another example, a feature may be a number of login failures or a number of login failures of distinct users being accessed by a particular source IP. Accordingly, in some cases, a feature may include a general feature and a subset of the general feature. As can be appreciated, the feature attribute is generally selected or configured in accordance with a desired identification of highly anomalous data. In this regard, the feature attribute may correspond to collected or observed data or, alternatively, a type of data that is generated or derived using collected data.

An aggregate attribute generally refers to an indication of a manner in which to aggregate data to identify a highly anomalous threshold for use in detecting highly anomalous data. Data may be aggregated in any number of ways. By way of example only, an aggregate attribute may be a total, an average, of any other aggregation of data.

A temporal attribute generally refers to a time span or window for which to aggregate data to identify a highly anomalous threshold for use in detecting highly anomalous data. In this regard, data is aggregated within or over a time span or period, which can be used to identify a highly anomalous threshold. A temporal attribute may be of any time span or amount. For example, a temporal attribute may be defined as five seconds, five minutes, three hours, one day, etc. The temporal attribute may be selected based on the particular type of data being analyzed. For example, a particular type of data collected more frequently or more frequently having highly anomalous data may correspond with a window of a shorter time span.

A duration attribute generally refers to a time duration over which data is analyzed. In this regard, a time duration may be selected for analyzing a particular type of data to identify a highly anomalous threshold for use in detecting highly anomalous data. A time duration may be of any amount. For example, data may be desired to be analyzed over a day, a week, a month, etc. The particular time duration to use for identifying a highly anomalous threshold may be based on the frequency of data collection and/or expected frequency of highly anomalous data occurrences.

A confidence attribute generally refers to a value to use to identify a highly anomalous threshold for use in determining when data is anomalously high. A confidence attribute may be represented in any form. As one example, a confidence attribute may be a value between 0 and 1 or a percentage value.

A sparsity attribute generally refers to an indication of whether the data is sparse or dense, or an extent thereof, or whether highly anomalous data is sparse or dense, or an extent thereof. In some cases, a sparsity attribute may specify sparse or dense. In another example, a sparsity attribute may specify whether data is sparse or not sparse (e.g., a 1 value indicating sparse data).

Various other highly anomalous attributes may be selected, input, identified, or obtained. By way of example, and with reference to FIG. 7, a configuration file for identifying highly anomalous data associated with login failures may be accessed that includes a set of highly anomalous attributes. The feature attribute 702 is specified to indicate the feature for use in creating a time series dataset for identifying a highly anomalous threshold. In this example, the feature attribute 702 specifies the failed logins column. The aggregate attribute 704 indicates to aggregate the feature of failed logins as a total. Feature attribute 706 indicates a subset of the feature. For example, feature attribute 706 specify a manner in which to group the data, including user identifiers (e.g., user name and unique user identifier (UUID)). The sparsity attribute 708 indicates sparsity or density, or an extent thereof, for use in analyzing the data. In this example, the sparsity attribute 708 indicates the data is sparse. The temporal attribute 710 specifies the temporal window or time span to use in performing the data aggregation. In this example, the temporal attribute 710 is set to 600 seconds. The confidence attribute 712 specifies when to identify data as highly anomalous. In this example, the confidence attribute 712 is set to 0.9. As such, the 0.9 value can be used to identify a highly anomalous threshold in association with a generated distribution. The duration attribute 714 indicates to analyze data over the past 30 days.

Examples of highly anomalous attributes may include, but are not limited to:

anomalyType: The anomaly name (ex.Password Spray)
dateToRun: Date to create anomalies over, if nonexistent then create anomalies over yesterdays data
ocsfEventClasses: The OCSF event classes to run over
eventCodesToUse: The event codes to use (ex. '4624', '4625')
extremeValueDistributionConfidence: The cumulative distribution probability to create threshold (ex. 0.9)
featureColumnName: The column name of the feature to aggregate (ex. bytes_out)
aggregatedFeatureColumnName: The column name to give to the aggregated featureColumnName (ex. totalBytesOut)
featureAggregateExpressionString: The sql aggregation expression for the feature ColumnName (ex. "approx_count_distinct(user_name)", "sum(bytes_out")). If this is empty, then automatically do a sum over featureColumnName.
featureGroupByFields: Fields to group the featureColumnName over (ex. user_name, user_uuid)
isSparse: Boolean indicating whether the data is sparse or dense
modelGroupByFields: Fields to create maximum values over. This is generally a subset of the featureGroupByFields (ex. user_name)
temporalAggregationSeconds: The value in seconds to aggregate the featureColumnName data over (ex. 3600 seconds)
numberOfSamplesToCreateMax: The number of samples to create the maximum for. For dense time series datasets, this is used as the total number of time-series values to use to create one max value. For sparse time-series datasets, this represents the highest numberOfSamplesToCreateMax values to use to estimate the parameters of the distribution
minSamples: The minimum number of samples to estimate the parameters of the distribution for
minimumFeatureValue: The minimum value for an anomalous feature (ex. do not create a data exfiltration anomaly if have less than 1 GB of data leaving the network)
filteringFields: Fields to filter on
coiGroupByFields: Group by fields to create distinct counts for to be used within the evidence coiAggregationFields: Aggregation fields to create distinct counts for to be used within the evidence
peerGroupType: Optional peer group name
joinWithPeerGroup: Optional boolean indicating whether to join with peer group
historicOutputTableName: Name of the historic maximum value table to save to and read from
maxNumberOfHistoricDays: Maximum number of days of historic data to use (e.g., if this is less than 0, then don't use any historic data)
userEntities: List containing user entity field names and their values
deviceEntities: List containing device entity field names and their values Any number and type of highly anomalous attributes may be set or designated. In some cases, highly anomalous attributes may have a default value that is implemented, unless specified otherwise. For example, a default aggregate attribute may be sum that is used to aggregate data, unless modified to specify another aggregation method.

In some cases, the anomaly attribute obtainer 620 obtains highly anomalous attributes in accordance with an indication to detect highly anomalous data. For example, a user (e.g., an analyst) may provide an indication to identify or detect highly anomalous data. In such a case, the user may specify one or more highly anomalous attributes to use in generating a highly anomalous threshold. For instance, the user may specify highly anomalous attributes via a user interface or selection of a desired configuration file. In other cases, the anomaly attribute obtainer 620 may obtain highly anomalous attributes in an automated manner. For example, assume highly anomalous data detection is desired or configured to be performed in a periodic manner (e.g., on a daily basis). In such a case, a configuration file to be used for performing a particular highly anomalous data detection may be automatically accessed in accordance with a predefined time duration for generation a highly anomalous threshold to use for anomaly detection.

A data pre-processor 622 is generally configured to pre-process data for use in performing highly anomalous data detection. In this regard, the data pre-processor 604 can prepare data such that a highly anomalous threshold can be determined. In embodiments, the data pre-processor 622 obtains the data to be pre-processed and used for identifying a highly anomalous threshold. In some cases, the particular dataset to utilize for identifying a highly anomalous threshold may be specified, for example, via a highly anomalous attribute. For instance, an attribute may indicate, via a configuration file, a set of data to use for threshold generation.

In some cases, the data pre-processor 622 performs schema flattening. As can be appreciated, various logs that may be analyzed may have varying formats. For example, a first type of log (e.g., Active Directory log) may have one format, while a second type of log (e.g., VPN log) may have another format. Further, such log formats, may depend on the provider, such as the VPN provider. In this regard, the different logs may have different field names, etc. Accordingly, a schema (e.g., fields) may be nested in structure. To enable a more efficient processing of data, the data pre-processor 622 may flatten the schema. In this way, more top-level fields or columns are generated, thereby enabling more efficient data processing.

In some cases, the data pre-processor 622 flattens particular data desired for use in performing highly anomalous threshold identification. For example, a highly anomalous attribute may indicate a type of data, such as a data field or data column, desired for analyzing to detect highly anomalous data. As one example, a particular configuration file used to detect highly anomalous data for a particular use case may be specified. Such a configuration file may include an indication of a desired field or column of data to analyze. The data pre-processor 622 may then flatten data as appropriate to remove a corresponding nesting structure and/or to obtain a desired top-level column(s).

In embodiments, the data pre-processor 622 may also perform data transforming and/or data filtering. As described, various feature types and granularities may be specified for performing highly anomalous threshold identification. As one example, although various data may be collected, in some cases, a particular feature, or type of data, may be desired to be analyzed. In such a case, the data pre-processor 622 may derive or transform the particular data for use in efficiently and effectively identifying a highly anomalous threshold.

As one example, assume anomaly detection is desired to be performed to detect highly anomalous login failures. As such, login failures may be analyzed to generate a highly anomalous threshold for use in performing anomaly detection. In some cases, a binary column may be desired for analysis that indicates login failures in a binary manner (e.g., a one value for a login failure and a zero value for a login success). Accordingly, the data pre-processor 622 may generate a binary column indicating success or failure of various logins. As can be appreciated, the data pre-processor 622 may generate or derive any type of data in association with any feature type, such that the created data for the desired feature can be used to generate a time series dataset for use in identifying a highly anomalous threshold.

As another example, assume anomaly detection is desired to be performed to detect password sprays. In such a case, feature values specific to password spray detection may be generated for use in identifying a highly anomalous threshold in association therewith. In one embodiment, the feature values to generate include failed logins aggregated per source IP. For example, such feature values may be created by combining various measures derived from the number of distinct user accounts and their corresponding failed logins to effectively encapsulate typical password spray behavior. Specifically, in analyzing login failure time series per user, the distinct users count are scaled by the median login failures count over all users by the scaled entropy of the user counts distributions. Instead of looking over overall login counts, the focus is on the median over the average login count over the users so that a user that has a high login failure count (as seen with brute force logins) doesn't skew the feature. The distinct users scaled by this median count should eliminate typical vulnerability scanners because they typically scan each user name only. To distinguish from brute force logins, the scaled entropy is used. As the number of login attempts per user is expected to be approximately equally distributed, the entropy over the user distribution counts should be close to a uniform distribution, or maximal. The uniform distribution entropy is used to scale to obtain a scaled entropy value that is contained between 0.0 and 1.0. This implies that the metric is lowered if there exist user accounts that have higher login failure rates than the others, which is not indicative of password spray. Rather than using the total failed logins, the median count scaled by the number of distinct users is used to prevent few accounts with large login failure rates (e.g., indicative of brute force attempts) from inflating this metric.

As another example, in some cases, a particular subset of data may be desired to be analyzed. In such a case, the data pre-processor 622 may filter the data for use in efficiently and effectively performing highly anomalous data detection. By way of example only, assume a subset of login failures is desired to be analyzed. For instance, password failures may be desired to be analyzed, while other types of login failures are undesired for analysis (e.g., login failures based on account expiration, etc.). Accordingly, the data pre-processor 622 may filter data (e.g., within a column) such that subsequent data analysis is based on the desired type of login failures to analyze.

The data pre-processor 622 may identify a manner in which to transform and/or filter data in any number of ways. As one example, one or more highly anomalous attributes may indicate a specific data transformation and/or data filtering to apply to a set of data. For instance, a configuration file may indicate to generate a new column of data by applying a particular data transformation. In this regard, in reading a configuration file, the data pre-processor 622 may identify a manner in which to transform and/or filter data. In other cases, the data pre-processor 622 may determine and/or apply a data transformation and/or data filtering in accordance with a default implementation or based on provided data (e.g., a feature attribute).

The highly anomalous threshold manager 624 is generally configured to identify highly anomalous thresholds. In this regard, the highly anomalous threshold manager 624 analyzes a set of data, such as data pre-processed via data pre-processor 622. As can be appreciated, the highly anomalous threshold manager 624 can identify a highly anomalous threshold in accordance with a specific or desired use case. In this way, the manner used to detect a highly anomalous threshold may be based on a particular use case, as indicated or desired. Such an anomaly detection use case may be specified, for example, via one or more highly anomalous attributes (e.g., indicated or specified in a configuration file configured for the use case).

In one embodiment, the highly anomalous threshold manager 624 includes a feature aggregator 632, a maximum value identifier 634, a distribution generator 636, and a threshold identifier 638. Although the highly anomalous threshold manager 624 is illustrated with these components, any number of components may be used to perform various functionalities described herein. This structure and implementation is not intended to limit the scope of embodiments disclosed herein.

The feature aggregator 632 is generally configured to aggregate data, or feature values, for a feature. In embodiments, the feature aggregator 632 aggregates feature values in accordance with a highly anomalous attribute(s). For example, highly anomalous attributes may indicate a feature for use in identifying a highly anomalous threshold and/or performing highly anomalous data detection, a manner in which to aggregate data, and a temporal window for use in aggregating data. In this regard, the feature aggregator 632 may obtain data associated with a desired feature and aggregate the data in accordance with a designated temporal window.

By way of example only, assume login failures are desired to be aggregated as a total in an hourly increment. In this regard, the feature aggregator 632 can sum or total login failures that occur within one-hour increments to create hourly temporal bins of data. For instance, a number of login failures is determined for a first hour, a number of login failures is determined for a second hour subsequent to the first hour, and so on. As another example, for data exfiltration, totals of bytes leaving a network within sequential four-hour windows may be identified.

In some embodiments, the aggregated data is in the form of a time series dataset. In this regard, data aggregated in association with each time window or bin is used to create a time series dataset representing the data in a time series dataset. For example, a first aggregated value in association with a first temporal window may be a first data value in a time series dataset, a second aggregated value in association with a second temporal window may be a second data value in the time series dataset, and so on.

The maximum value identifier 634 is generally configured to identify maximum values associated with the aggregated data. Maximum values generally refer to a greatest or highest value(s) of a set of data. In embodiments, the maximum value identifier 634 analyzes a time series dataset and creates a sequence of maximum values.

Maximum values may be identified in any of a number of ways. In some cases, a manner in which to identify maximum values may depend on whether the data being analyzed corresponds with sparse or dense data and/or anomalies. As described, in some cases, anomalies, or highly anomalous data, may be indicated or specified as sparse. For example, high login failures may be expected to occur in a sparse manner. In instances in which data corresponds with a sparse indicator, maximum values may be identified using a configurable or predetermined number of values to select within a max-value time duration (e.g., also referred to as number of samples to create max highest values). A max-value time duration refers to a duration of time in which one or more maximum values are to be identified. In some cases, a max-value time duration may be a day (e.g., a day being analyzed). Any max-value time duration may be used and is not intended to be limited herein. In embodiments, the predetermined number of values to select and/or the max-value time duration may be specified via one or more highly anomalous attributes set by a user. In other cases, the predetermined number of values to select and/or the max-value time duration may be pre-configured or a default value(s), or otherwise determined (e.g., dynamically determined based on the particular data being analyzed).

Figure 8:
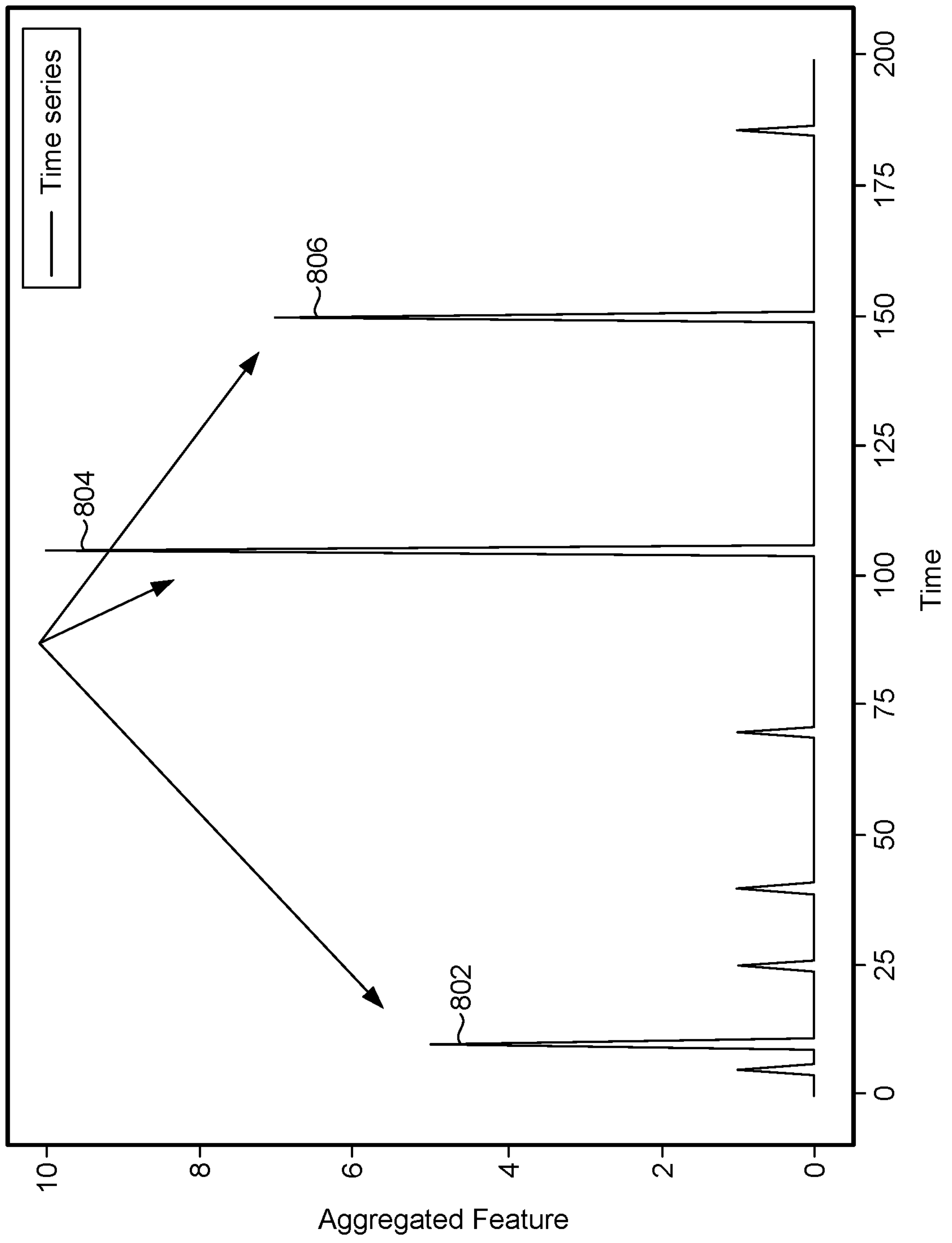

By way of example, and with reference to FIG. 8, assume the data is aggregated by summing login failures within five second time bins and is indicated as being associated with a sparse indicator. As illustrated, the data is generally sparse over the 200 seconds illustrated. Further, assume a set of three maximum values are to be identified over a 200 second max-value time duration. In such a case, the three greatest values, as shown at 802, 804, and 806 are identified as maximum values for this max-value time duration.

In instances in which data corresponds with a dense indicator, a maximum value may be identified within each max-value time duration of a sequence of max-value time durations. For example, a maximum value may be identified in association with a rolling max-value time duration. As such, as the max-value time duration moves or rolls to a subsequent time duration, a maximum value is selected or identified from the particular duration.

Figure 9:
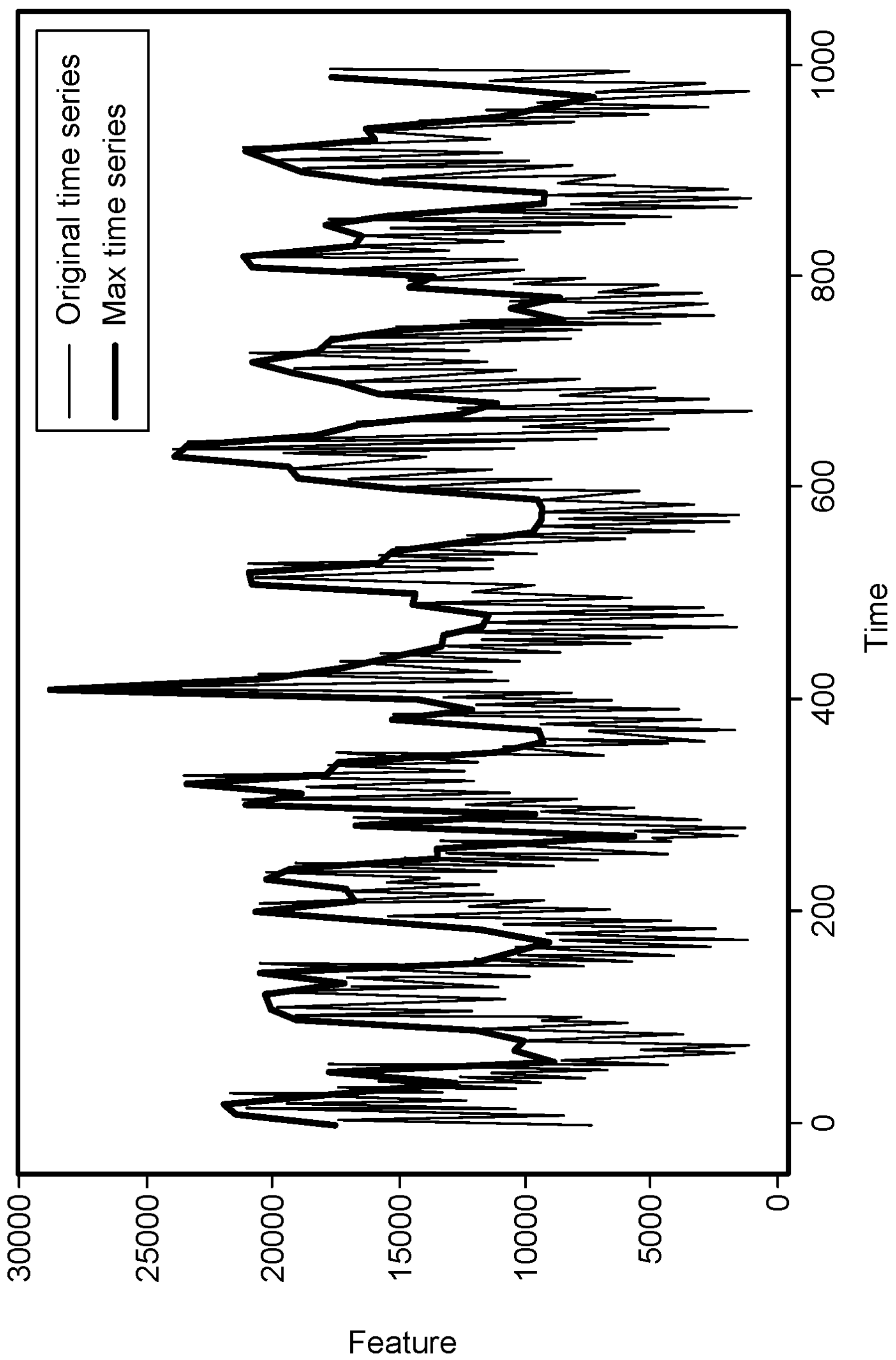

By way of example, and with reference to FIG. 9, FIG. 9 illustrates a dense time series dataset. In this example, assume the max-value time duration is 20 seconds, such that a maximum value is identified over each subsequent 20 second window. Accordingly, 50 maximum values are identified from this time series dataset over 1,000 seconds. As such, this approach enables maximum values to be distributed over time.

In some cases, the feature aggregator 632 and/or maximum value identifier 634 (or other components), may operate in a batch manner or a periodic manner. In a batch implementation, a set of data over a period of time is accessed and analyzed. For example, data over the last month may be accessed and analyzed to identify a highly anomalous threshold. In a periodic manner, a set of more recent data is accessed and analyzed and aggregated with prior analyzed data. In this way, detecting a highly anomalous threshold can be performed in a more efficient manner. By way of example only, in some cases, the feature aggregator 632 and/or maximum value identifier 634 may aggregate data associated with a feature and/or identify maximum values for a recent or current time frame, such as the current day or previous day. Such data may be aggregated with prior data, such as prior data analyzed in the month. For instance, maximum value data for a current day may be identified and combined with historical maximum value data over a configurable amount of days (e.g., accessed from a data store). In this way, data associated with a current time period (e.g., a current day) may be processed, while previously processed data is accessed and combined with the current data to estimate parameters of a distribution associated with such data.

As previously described, a feature may be of any level of granularity including indications of sub-features, or subsets of features. In this regard, in some cases, the feature aggregator 632 and/or maximum value identifier 634 (or other components) may operate to aggregate and/or identify maximum values in accordance with a feature subset. For instance, assume a feature is login failures and a subset of such login failures is per user (e.g., via a user identifier). In such a case, the feature aggregator 608 may aggregate login failures in a per-user manner, and such per-user aggregated login failures may be used to identify maximum values. As another example, assume a password spray feature is specified as well as source IP sub-features. In such a case, data may be aggregated in association with various source IPs to create different time series datasets in a per-source ID manner (e.g., to identify if a source IP is logging into numerous usernames). Such time series datasets can then be used to identify maximum values. As described herein, the data distribution can be generated in association with the various feature subsets. Continuing with this example, the data distribution can be generated in association with each of the source IPs. In other cases, the data distribution can be generated in associated with a feature including each of the feature subsets The distribution generator 636 is generally configured to generate a distribution (e.g., a statistical distribution). In embodiments, the distribution generator 636 generates a distribution for the analyzed data. In particular, the distribution generator 636 generates a distribution of maximum values. In embodiments described herein, an extreme value distribution that represents the maximum values is generated. Such an extreme value distribution may be used to determine a likelihood associated with a highly anomalous data, or an extreme data value.

To generate an extreme value distribution, the distribution generator 636 can estimate one or more parameters of an extreme value distribution. In some cases, to estimate the distribution parameters, the distribution generator 636 may collect the maximum values into an array or sequence. Parameters may be estimated as a function of the collected maximum values observed. The distribution generator 612 may be configured to generate any type of distribution. One example distribution is a Gumble distribution. The Gumble distribution is an extreme value distribution. That is, the Gumbel distribution may be used to model extreme value distributions. Accordingly, in one implementation, the distribution generator 636 may determine or estimate parameters of the Gumble distribution. Estimating parameters of the Gumble distribution enables determining characteristics of the distribution that best describes the maximum value data. For the Gumbel distribution, the parameters estimated include location (μ) and scale (β).

To estimate Gumbel distribution parameters, the Gumbel distribution may be fit to the data (e.g., via a plot of data against Gumbel distribution). The probability density function (PDF) of a Gumbel distribution may be represented as:

$$f(x;\mu,\beta)=\frac{1}{\beta}\exp\left(-\frac{x-\mu}{\beta}-\exp\left(-\frac{x-\mu}{\beta}\right)\right)$$

wherein μ is the location parameter and β is the scale parameter. To estimate such parameters from a given dataset $X=\{x_1, x_2, \ldots, x_n\}$, a log-likelihood function may be maximized. A log-likelihood function, such as Maximum Likelihood Estimation (MLE), for the Gumbel distribution may represented as:

$$\ln L(\mu,\beta)=-\frac{n}{\beta}-\sum_{i=1}^{n}\left(\frac{x_i-\mu}{\beta}+\exp\left(-\frac{x_i-\mu}{\beta}\right)\right)$$

wherein n represents the number of observations, $x_i$ represents the individual data points, and u and B represent the parameters to be estimated. In this regard, the log-likelihood function is used to identify parameter values that maximize the likelihood of observing the given data. Differentiating such a log-likelihood function with respect to the location parameter and the scale parameter and setting the derivatives to zero may be used to identify maximum likelihood estimates.

In some cases, numerical optimization techniques may be employed to maximize the log-likelihood function and obtain the parameter estimates. Example techniques include Newton-Raphson method and gradient descent. For example, in the fitting process, Newton-Raphson may be used to maximize the likelihood function. As one example implementation, first and second derivatives of the log-likelihood function may be determined with respect to the location and scale parameters. Initial values for the parameters may be selected as a beginning point for each Newton-Raphson iteration. The Newton-Raphson iteration for parameter θ is given by:

$$\theta_{new}=\theta_{old}-\frac{f'(\theta_{old})}{f''(\theta_{old})}$$

wherein $f'(\theta_{old})$ is the first derivative and $f''(\sigma_{old})$ is the second derivative. Such an iterative update is performed until convergence criteria are met. For example, convergence may be attained upon determining the parameter values are changing below a threshold value or upon performing a particular number of update iterations. Upon attaining convergence, the final parameter values may be designated as the maximum likelihood estimates.

In accordance with identifying distribution parameter estimates, the distribution can be fitted to the data using the estimated parameters. In this regard, using the estimated parameters, fitted values for the Gumbel distribution may be generated. In one approach, data points can be substituted into the Gumbel PDF with the estimated parameters. In particular, the estimated parameters can be plugged into the Gumbel PDF. Thereafter, the data points can be substituted into the Gumbel PFT with the estimated parameters to provide the fitted values, as shown below:

$$\text{Fitted Value for } x_i=f(x_i;\hat{\mu},\hat{\beta})=\frac{1}{\hat{\beta}}\exp\left(-\frac{x_i-\hat{\mu}}{\hat{\beta}}-\exp\left(-\frac{x_i-\hat{\mu}}{\hat{\beta}}\right)\right)$$

Such a process can be performed for various data (e.g., each data in the dataset) to obtain the corresponding fitted values. Such fitted values represent the probability density at each data point according to the Gumbel distribution model. In some cases, statistical tests or graphical methods may be performed to assess the fit quality. For example, a Kolmogorov-Smirnov test, an Anderson-Darling test, a quantile-quantile plots, etc. may be used to assess fit of data. In cases in which the fit is unsatisfactory, parameter estimates may be refined. Although examples provided herein use the Gumbel distribution, other distributions or approaches may be used (e.g., Fréchet distribution, etc.).

In embodiments, a distribution may be generated in accordance with a particular feature subset. For example, a first distribution may be generated for a first feature subset, and a second distribution may be generated for a second feature subset. In other embodiments, a distribution may be generated in accordance to a set of feature subsets. For example, although a time series data set may include aggregated data of a subset (e.g., a metric is aggregated per source IP), a distribution may be generated including maximum values from one or more feature subsets (e.g., a distribution is created over a homogenous group of IPs likely attempting to log into the same domain, device, etc.).

The threshold identifier 638 is generally configured to identify a highly anomalous threshold for use in identifying highly anomalous data. A highly anomalous threshold refers to a value used as a threshold for identifying highly anomalous data. In this regard, a data point that falls beyond a threshold (e.g., above a threshold) can be identified as highly anomalous. Data points that do not fall beyond the threshold are not designated as highly anomalous and, in some cases, may be designated as normal data (e.g., a normal amount of login failures).

To identify a highly anomalous threshold, a confidence attribute may be used. For example, a confidence value obtained as an anomaly attribute may be used to identify a highly anomalous threshold. In this way, a confidence value can be used in association with an estimated distribution to identify a highly anomalous threshold. For instance, assume a confidence value of 0.9 is provided for use in identifying a highly anomalous threshold. In such a case, the threshold identifier 638 can identify where, or at what position, does approximately 90% of the data fall below that point and approximately 5% falls above that point.

Figure 10:
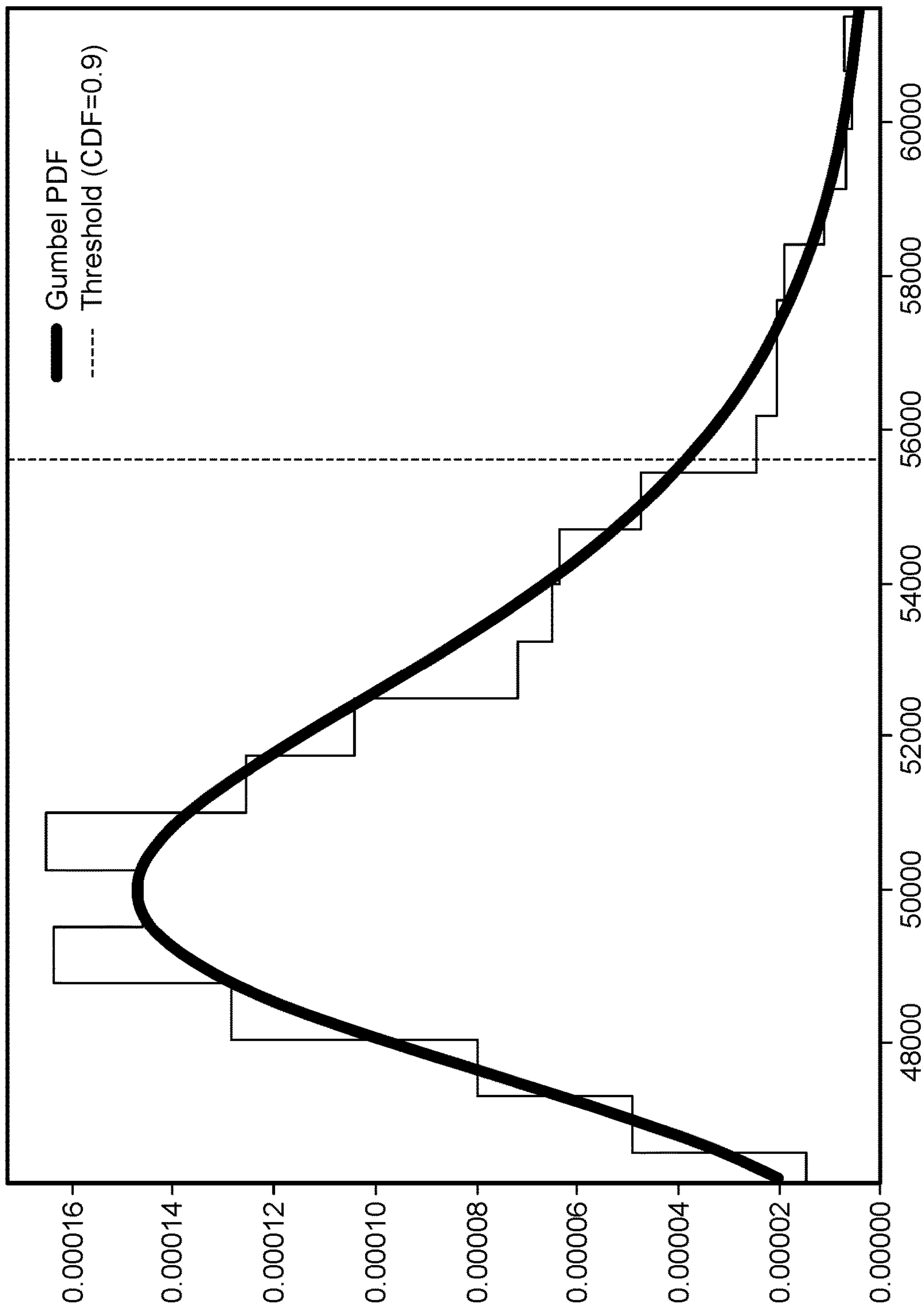
FIG. 10 provides an example data distribution for identifying a highly anomalous threshold, in accordance with embodiments described herein.

By way of example only, and with reference to FIG. 10, FIG. 10 illustrates a distribution with a location parameter of about 50,000. Assume the confidence threshold is 0.9. To identify the highly anomalous threshold, a determination may be made as to the value or point (e.g., along the x-axis) at which 90% of the data falls below. In using the distribution and the confidence threshold of 0.9, an identification of a highly anomalous threshold may be identified (e.g., about 55,600) and anything above that may be deemed anomalously high.

Returning to FIG. 6, the highly anomalous data detector 626 is generally configured to detect highly anomalous data. In embodiments, the highly anomalous data detector 626 uses a highly anomalous threshold (e.g., as determined by the highly anomalous threshold manager 624) to detect highly anomalous data. In some cases, the highly anomalous data detector 626 may detect highly anomalous data in association with a dataset from which the highly anomalous threshold was determined. For example, assume a particular dataset is accessed and used to identify maximum values and generate a highly anomalous threshold associated therewith. In some cases, the particular dataset, or a portion thereof, may be compared to the highly anomalous threshold to identify which, if any data, is highly anomalous. Additionally or alternatively, the highly anomalous data detector 626 may detect highly anomalous data in association with a dataset that is distinct from the dataset used to identify a highly anomalous threshold. For instance, a first dataset may be accessed and used to identify maximum values and generate a corresponding highly anomalous threshold, and a second dataset may be accessed and compared to the highly anomalous threshold to identify which, if any data in the second dataset, is highly anomalous. As can be appreciated, in some cases, the second dataset may be subsequently captured data extending from the first dataset. For example a first portion of a dataset may be used to generate a highly anomalous threshold, while data captured or observed subsequent to generating the highly anomalous threshold is analyzed for identifying highly anomalous data.

Figure 11A:
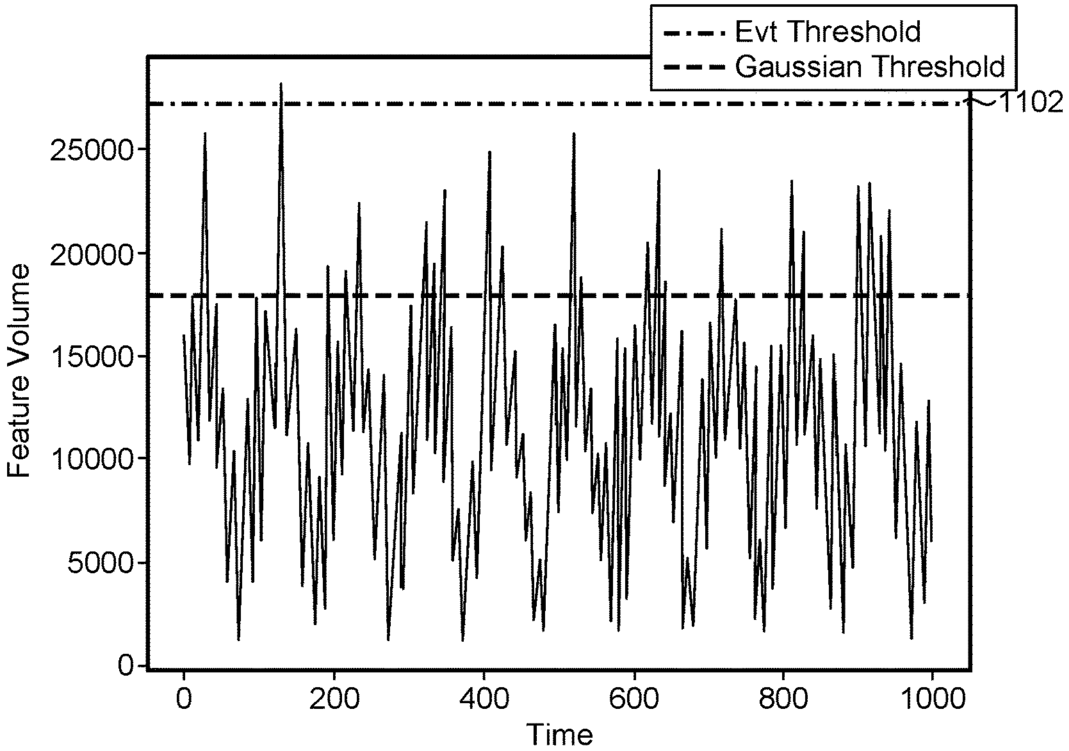
FIGS. 11A-11B provide example illustrations of a highly anomalous threshold relative to data, in accordance with embodiments described herein.
Figure 11B:
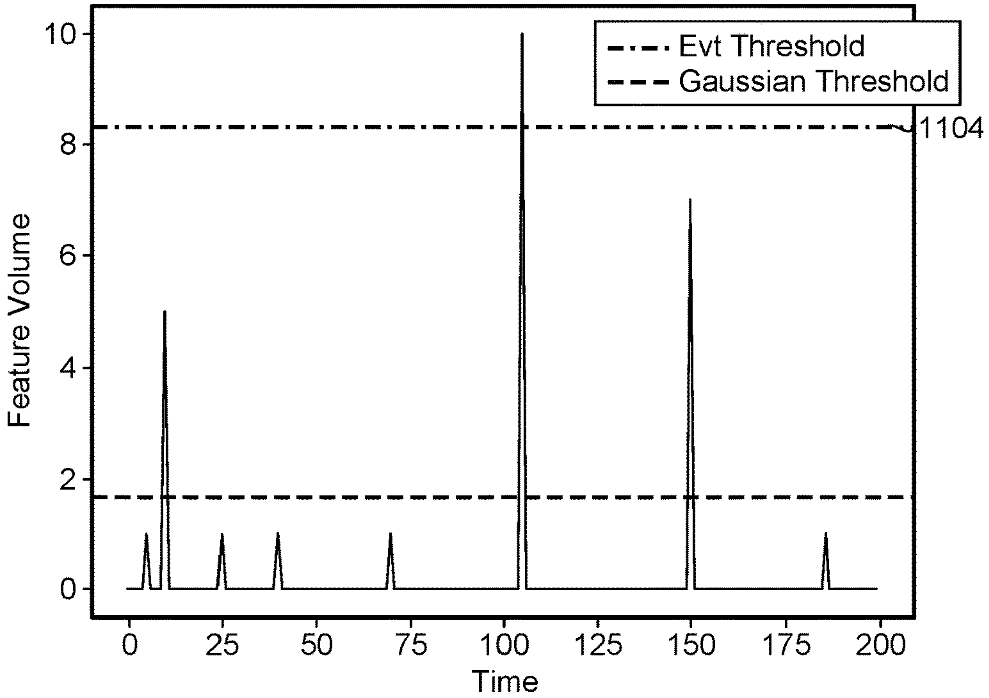

By way of example only, and with reference to FIGS. 11A-11B, FIGS. 11A and 11B provide examples of a highly anomalous threshold compared to a dataset for use in identifying anomalous data. For instance, with respect to FIG. 11A, assume the highly anomalous threshold 1102 is identified. In comparison with the data, only a single data point is detected as highly anomalous relative to the highly anomalous threshold 1102. Turning to FIG. 11B, assume the highly anomalous threshold 1104 is identified. In comparison with the data, only a single data point is detected as highly anomalous relative to the highly anomalous threshold 1104. Both of these highly anomalous thresholds are shown in comparison to data that would be identified as highly anomalous in cases in which a Gaussian threshold is used to detect such anomalies.

In embodiments, the highly anomalous data detector 626 performs highly anomalous data analysis on incoming or obtained event data. In some cases, event data 640 may be obtained in a real-time or streaming manner. In other cases, event data 640 may be referenced and obtained, for example, based on a user indication to perform anomaly analysis in association with a set of data.

In some cases, data values (e.g., in association with events or event data) to be analyzed are compared to the highly anomalous threshold to identify highly anomalous data. In other cases, a filter may be used to filter on feature values that are greater than or equal to the highly anomalous threshold to identify highly anomalous data.

In some implementations, a minimum feature value threshold may be used in identifying highly anomalous data. For example, in some cases, in order to identify a data value as highly anomalous, the data may need to be greater than a minimum feature value threshold in addition to being higher than the highly anomalous threshold. In this regard, a data value may not be identified highly anomalous even if determined to be above the highly anomalous threshold. As such, a data value being analyzed may be compared to a highly anomalous threshold and a minimum feature value threshold. In other cases, a data value being analyzed may be filtered on feature values that are greater than or equal to a highly anomalous threshold and also greater than or equal to a minimum feature value threshold. In some cases, a minimum feature value threshold is obtained as a highly anomalous attribute. For instance, a minimum feature value threshold may be provided in a configuration file for a particular use case.

By way of example only, assume a minimum feature value threshold is established to be 50 gigabytes to identify highly anomalous data in the context of data exfiltration. In such a case, for a data value to be identified as highly anomalous, the data value must be at least 50 gigabytes or greater leaving the network. As another example, assume login failures are generally low (e.g., frequently zero). A minimum feature value threshold of five may be set such that login failures of one, two, three, and four are not identified as highly anomalous data.

In some embodiments, the highly anomalous data detector 626 may generate an anomaly score. An anomaly score indicates an extent or probability of the value being highly anomalous. In some cases, an anomaly score is represented as a probability of values (e.g., all values) that are less than or equal to the value identified as highly anomalous indicating to what extent this value is anomalous.

Although a data value may be identified as anomalously high (e.g., based on a highly anomalous threshold), in some cases the data value may not result in data that is of interest or concern or may result in data that is of more interest or concern. Stated differently, a data value identified as anomalously high may not be suspicious or a malicious security threat, or alternatively, may be more suspicious. By way of example only, assume a login failure(s) is identified as highly anomalous. Further assume that a successful login is identified following a login failure(s). Such a successful login is important to the context of the login failure analysis and may result in the login failure identified as highly anomalous being identified as more suspicious.

Accordingly, in some embodiments, an anomaly context manager 628 may be executed to identify context in association with data identified as highly anomalous. Anomaly context manager 628 is generally configured to generate and/or use context associated with data identified as highly anomalous. In some cases, anomaly context manager 628 may generate context that is used to adjust an anomaly score, determine whether to present a highly anomalous data to a user, or otherwise designate the data as highly anomalous. Additionally or alternatively, anomaly context manager 628 may generate context that is provided in association with a highly anomalous data to provide context or additional information to the user related to the data identified as highly anomalous. As such, the anomaly context manager 628 may operate to enrich or supplement highly anomalous data analysis.

In some cases, the anomaly context manager 628 operates to perform functionality associated with a particular use case(s). In this regard, the anomaly context manager 628 may include multiple anomaly context instructions 628-1 through 628-N. For example, a first anomaly context instruction may be configured to generate and/or use context related to login failures, and a second anomaly context instruction may be configured to generate and/or use context related to password sprays. Various use cases for which anomaly context instructions may be implemented include, for example, failed logins, password spray, data exfiltration, insider threat (e.g., internal data downloading), kerberoasting, ransomware, crypto mining, resource destroying (e.g., high rate of destroying resources), access key creation (e.g., high rate of access key creation), security scanning, etc.

As one example, anomaly context manager 628 may be configured to generate and/or use context related to data exfiltration (e.g., via anomaly context instruction 628-1). For example, in analyzing data for data exfiltration, it may be considered more suspicious when data is sent to an uncommon component (e.g., within the user's environment). For instance, assume data is sent to a control center and it is unlikely IPs in the environment communicate with this destination IP. In addition to identifying data communication to a suspicious destination IP, the anomaly context manager may also adjust the anomaly score based on such a determination. For instance, the anomaly score may be lowered based on such a determination.

As another example, an anomaly context manager 628 may be configured to generate and/or use context related to login failures. For example, in analyzing data for login failures, it may be considered more suspicious when login failures are detected in a more periodic manner or pattern, as opposed to a random manner. For instance, in cases in which login failures are identified as periodic, a programmatic job (e.g., malicious script) is more likely an initiator of such logins, thereby resulting in more suspicious data. On the other hand, more random login failures may more likely correspond with user-initiated logins.

Accordingly, the anomaly context manager 628 may analyze and identify inter-arrival times between login failures. In some cases, the inter-arrival times may be provided as output for display to a user to provide context to data identified as highly anomalous. Additionally or alternatively, the inter-arrival times may be used to modify or adjust the anomaly score associated with the data. For example, based on an identified login pattern (e.g., based on the inter-arrival times), the anomaly score may be increased. On the other hand, based on a random login pattern (e.g., identified based on the inter-arrival times), the anomaly score may be decreased.

Additionally or alternatively, the anomaly context manager 628 may analyze successful logins in association with a login failure(s). As described, assume a login failure(s) is identified as highly anomalous. Further assume that a successful login is identified following a login failure(s). Such a successful login is important to the context of the login failure analysis and may result in the login failure identified as highly anomalous being identified as extremely suspicious. In this regard, the anomaly context manager may identify or detect an eventual successful login following one or more login failures. In accordance with identifying a successful login, the anomaly score may be adjusted (e.g., increased).

As another example, the anomaly context manager 628 may be configured to generate and/or use context related to password sprays. A password spray generally refers to a cyber-attack technique in which an attacker attempts to gain unauthorized access to a large number of accounts by systematically attempting a few common passwords or using a small set of passwords against many usernames. In particular, a password spray is a distributed approach that targets a set of accounts and attempts known passwords against them. A password spray also typically performs login attempts in rounds in order to prevent account lockouts. Within each round, a fixed amount of passwords (e.g., five passwords) are attempted against each account in the set. Upon the password attempts for each account, the password spray script typically pauses or sleeps for a fixed period of time (e.g., an hour) before moving on to a subsequent group of passwords (e.g., resulting in short bursts of periodic attempts). In this regard, an attacker attempts to avoid detection by not triggering multiple failed login attempts for a single account.

Anomaly context related to a password spray can be identified in any number of ways. As one example, data may be analyzed for password sprays in accordance with patterns typically performed via a password spray script. As described, a password spray script generally is a distributed approach that targets a set of accounts and attempts known passwords against them and also performs login attempts in rounds in order to prevent account lockouts. Accordingly, an anomaly context manager may assess data to determine whether the amount of time between consecutive failed logins over all users appears to be periodic or programmatic, thereby indicative of a password spray script and more likely to be suspicious.

In one implementation, the anomaly context manager may analyze as to whether a bi-modal inter-arrival distribution exists indicative of a password spraying round followed by a pause to prevent account lockout, followed by another password spray round, etc. In operation, inter-arrival times for failed logins may be determined (e.g., obtain time for each failed login and calculate the time interval between the failed logins). Based on the short bursts of periodic attempts performed via password spray scripts, a bi-modal distribution results, including a small period (e.g., five seconds) for a first mode (e.g., time between login attempts) and a larger period (e.g., five hours) for a second mode (e.g., time between rounds). As such, a Gaussian mixture model can be used. The Guassian mixture model may include a first Gaussian distribution with a first mean and a first variance in association with the first mode and a second Gaussian distribution with a second mean and a second variance in association with the second mode. In accordance with the estimated means and variances, the behavior or pattern of such data can be analyzed to identify whether a possible password spray behavior exists. For example, it may be determined whether the larger mean is more than a threshold later than the smaller mean, whether small bursts followed by a delay in time exists, etc. In some cases, if a password spray is expected, the anomaly score can be increased. If a password spray is not expected, the anomaly score may be maintained or may be decreased.

The anomaly context manager 628 may provide various types of other analyses to identify anomaly context, for example, in accordance with a desired anomaly detection use case. For instance, failed logins occurring at certain times (e.g., outside work hours) and/or in certain geographical regions or areas may be identified as suspicious. In another example, a number of distinct days including failed logins associated with a source IP may be counted. In some cases, a lower count number indicates more suspicious data. In another example, the anomaly context manager may analyze the login failure reason. For instance, failure reasons associated with a correct user name, but incorrect password (e.g., failure reason 0xC000006A) may be counted. When the count value or percent of login failures correspond with such a failure reason, the failed logins may be identified as suspicious. In yet another example, the anomaly context manager may analyze for insider threats. In such a case, the anomaly context manager may analyze file extensions of data. For instance, in cases in which file extensions being downloaded are rare (e.g., particularly in association with a user or user role), the likelihood of suspicious data increases. By way of example only, assume an individual is in the Human Resources group and numerous Java Archive (JAR) files are downloaded. In such a case, downloading of a threshold number of JAR files may be identified as suspicious.

In embodiments, to generate or identify anomaly context, the anomaly context manager 628 may obtain context attributes. Context attributes generally refer to attributes or parameters indicating a manner in which to generate or identify contextual information in association with data (e.g., data identified as highly anomalous). In some cases, the context attributes are specific to a particular anomaly detection use case. For example, in cases in which high login failure is to be analyzed, an attribute indicating an amount of time within which to identify a successful login following a failed login(s) may be specified.

Context attributes may be obtained in any of a number of ways. In some cases, context attributes are included in, or coded in, anomaly context instructions (e.g., instruction 628-1). In some cases, context attributes are input via a user interface. For example, an analyst may provide context attributes for use in identifying contextual data via a graphical user interface. For instance, a user interface may be presented with various attribute options, and a user may select one or more context attributes for use in identifying context data. In other cases, context attributes may be obtained via a configuration file for use in identifying contextual data. For example, a configuration file including various context attributes for identifying contextual data may be obtained (e.g., via data store 632). In this regard, the anomaly context manager 628 can read in a configuration file that includes various context attributes. Such a configuration file may be a same configuration file or a different configuration file as that used to generate a highly anomalous threshold.

By way of example only, assume an anomaly context manager is analyzing data to identify context in association with a potential password spray. In such a case, various context attributes that may be obtained (e.g., via a configuration file) include:

```
use_case: Scenario name
src_ip: Scenario source ip
users: User list to attempt passwords against
jitter_min: Min jitter added to periodic login attempts in seconds
jitter: Jitter added to the periodic login attempts in seconds
password_attempts_user: Number of password attemps for a single user within a round
delay_between_rounds: Delay in minutes between consecutive password spray rounds
total_rounds: The total amount of rounds => number of passwords =
password_attempts_user * total_rounds
```

In this regard, such context attributes can be employed by the anomaly context manager 628 to analyze data for a potential password spray event.

In some cases, various anomaly context instructions (e.g., 628-1 through 628-N) may operate to identify different types of anomaly context. In such cases, the context may be aggregated by the anomaly context manager 628 to adjust the anomaly score, as appropriate. In this regard, upon analysis, if the data appears suspicious, the anomaly score may be increased, while the anomaly score may be decreased if the data does not appear suspicious.

The data provider 630 is generally configured to provide highly anomalous data, or context associated therewith. In some cases, the data provider 630 provides highly anomalous data and/or context associated therewith 642 to the user device for display to a user. In other cases, the data provider 630 provides such data 642 to another component or service, for example, for further analysis, to prevent or terminate a security issue or threat, etc.

In some cases, the data provider 630 provides the identified highly anomalous data, as identified via highly anomalous data detector 626. Additionally or alternatively, the data provider 630 provides an anomaly score associated with the highly anomalous data. For example, the anomaly score can be presented to the user as context along with the highly anomalous data and/or context information. In other cases, the anomaly score may be used to determine whether to present the highly anomalous data, or data associated therewith (e.g., context data) to the user or used to determine a rank or priority for presenting the data. For example, for an anomaly score below a threshold (an anomaly score threshold), a determination may be made to not present an indication of highly anomalous data. By way of example only, an anomaly score that is 0 can result in data that is not presented to the analyst. On the other hand, for an anomaly score above a threshold, a determination may be made to present an indication of the highly suspicious data. For example, anomaly scores greater than a threshold value may be provided to a user, thereby providing alerts associated with data more likely to be suspicious while preventing alert fatigue. As can be appreciated, an anomaly score presented may be a baseline anomaly score identified by the highly anomalous data detector 626 or an adjusted anomaly score determined by the anomaly context manager 628.

Additionally or alternatively, the data provider 630 may provide anomaly context, for example, as identified via the anomaly context manager 628. Anomaly context may be of any type, for example, associated with a particular anomaly detection use case. By way of example, anomaly context may include an indication of whether a successful login occurred after a failed login, an inter-arrival time between failed logins, whether a password spray is suspected and data associated therewith, etc.

Highly anomalous data and/or corresponding context may be provided for display in any number of ways. For example, a risk or alert message may be provided for display that indicates a type of suspicious behavior (e.g., password spray, high login failures, etc.), data indicating the suspicious behavior (e.g., count of login failures, inter-arrival time within a password-spray round, time between password spray rounds), dates/times, and/or other contextual information.

Figure 12:
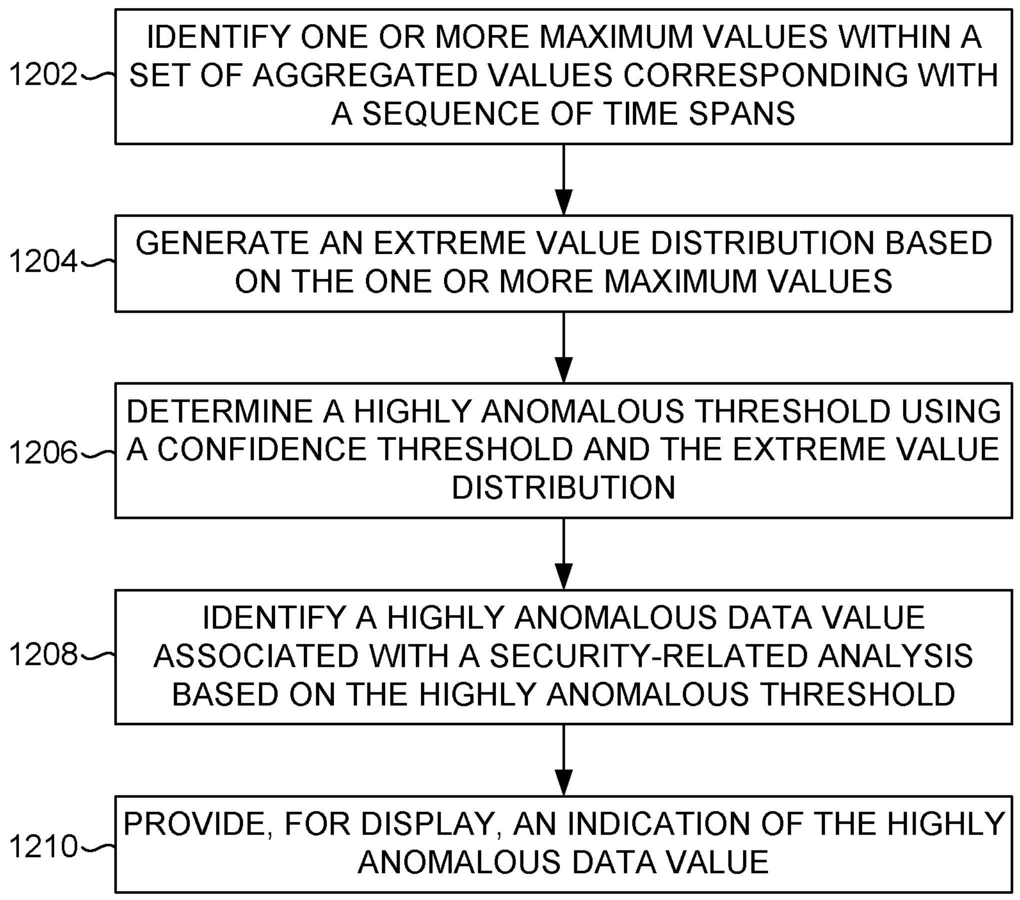
FIG. 12 provides an example of a process that may be performed to facilitate efficient detection of highly anomalous data, in accordance with embodiments described herein.
Figure 13:
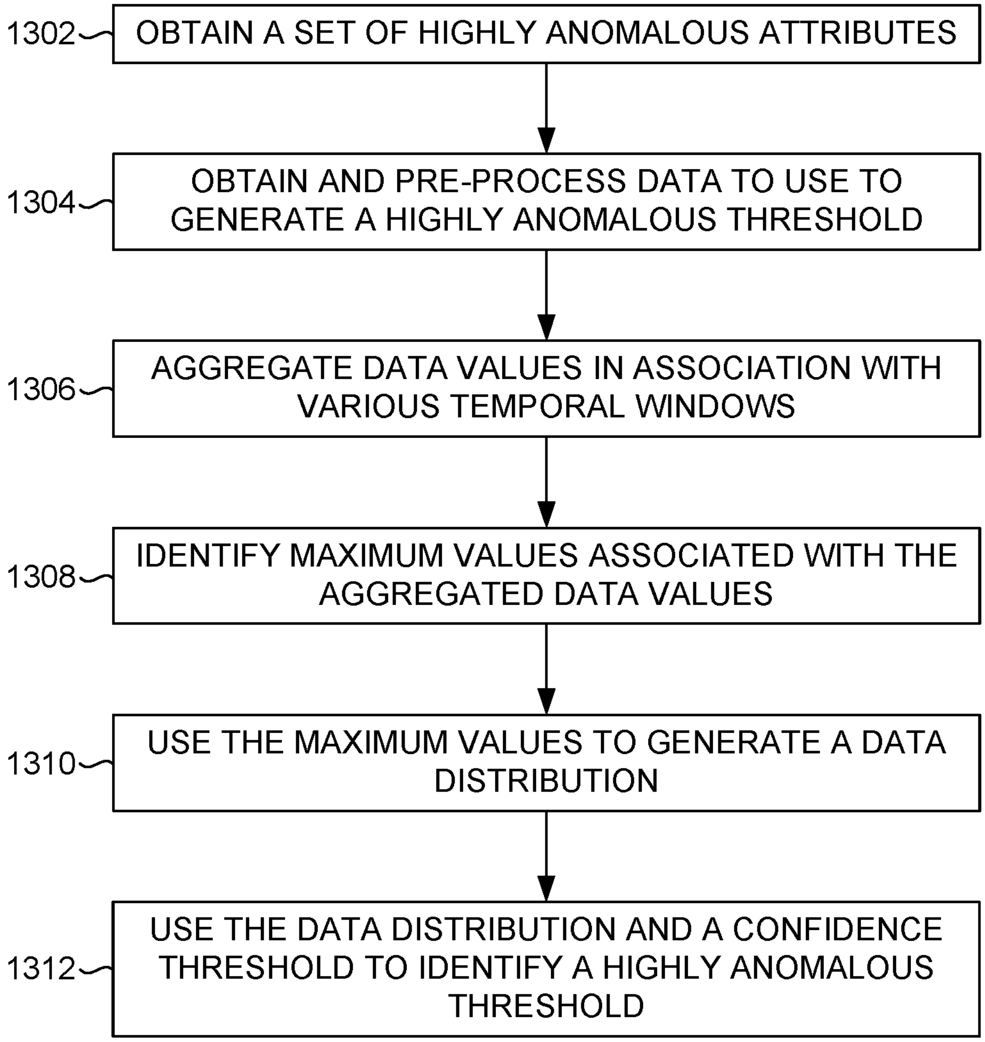
FIG. 13 provides an example of a process that may be performed to facilitate efficient identification of highly anomalous thresholds, in accordance with embodiments described herein.
Figure 14:
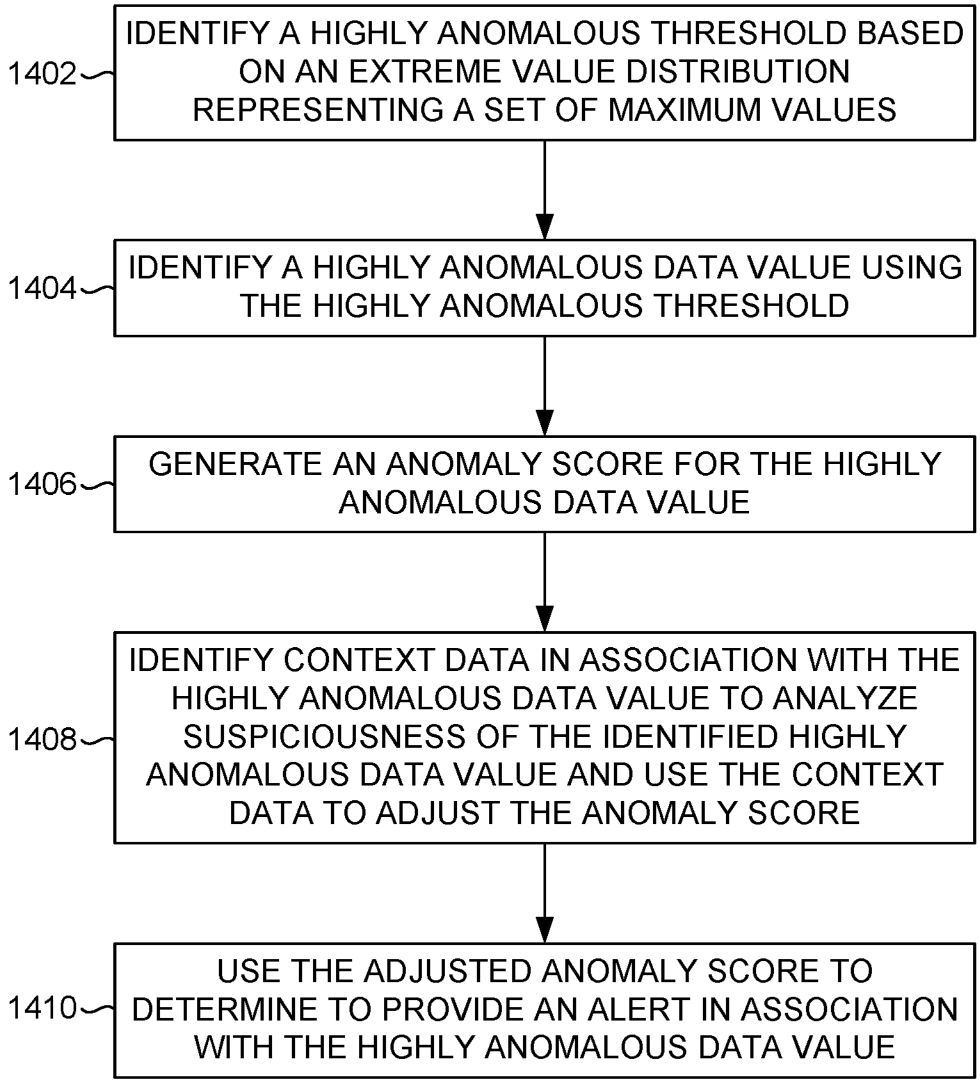
FIG. 14 provides an example of a process that may be performed to facilitate efficient detection of highly anomalous data, in accordance with embodiments described herein.

5.2 Methods for Facilitating Highly Anomalous Data Detection in an Analytics Service Various methods or implementations may be employed to efficiently and effectively manage analytics, in accordance with embodiments provided herein. FIGS. 12-14 provide some examples, but are not intended to be limited herein. The method and ordering of steps or blocks are not intended to be limiting.

With reference to FIG. 12, FIG. 12 illustrates an example of a process that may be performed to facilitate efficient detection of highly anomalous data in an analytics service, in accordance with embodiments described herein. In some embodiments, aspects of FIG. 12 may be performed by an analytics service, such as analytics service 611 of FIG. 6.

Initially, at block 1202, one or more maximum values within a set of aggregated values corresponding with a sequence of time spans are identified. An aggregated value may be an aggregation (e.g., total or average) of data values that fall within a particular time span. Generally, values are aggregated in association with a desired feature to be analyzed. Selection of the maximum values may depend on the structure of data and/or data anomalies. For example, maximum values may be selected in a different manner, depending on whether the data and/or data anomalies are more dense or sparse.

At block 1204, an extreme value distribution is generated based on many maximum values. The extreme value distribution may be generated by identifying parameters associated with the extreme value distribution and fitting the maximum values to the distribution. In some cases, the extreme value distribution is a Gumble distribution. To identify distribution parameters, a MLE technique and/or Newton-Raphson technique may be used.

At block 1206, a highly anomalous threshold is determined using a confidence threshold and the extreme value distribution based on many maximum values. In embodiments, the confidence threshold may be a value or probability desired for identifying a highly anomalous threshold. In some cases, the confidence threshold may be obtained via a configuration file.

At block 1208, a highly anomalous data value associated with a security-related analysis is identified based on the highly anomalous threshold. In this regard, in some cases, the highly anomalous data value may be compared to the highly anomalous threshold. For example, data values greater than the threshold value may be identified or designated as highly anomalous, while data values less than the threshold value may be identified or designated as non-highly anomalous.

At block 1210, an indication of the highly anomalous data value associated with the security-related analysis is provided for display. In this regard, the highly anomalous data value may be provided for display to a user. Alternatively or additionally, anomaly scores and/or context may be generated and provided for display (e.g., in association with the highly anomalous data value). In some cases, the highly anomalous data value may be provided for display upon determining the data value is of enough suspiciousness to deem it relevant or desirable for a user to view. For example, a highly anomalous data value having an anomaly score greater than a threshold value may be identified for communicating to the user.

FIG. 13 illustrates an example of a process that may be performed to facilitate efficient identification of highly anomalous thresholds, in accordance with embodiments described herein. In some embodiments, aspects of FIG. 13 may be performed by an analytics service, such as analytics service 611 of FIG. 6.

Initially, at block 1302, a set of highly anomalous attributes are obtained. The highly anomalous attributes can indicate a manner in which to identify a highly anomalous threshold. In some cases, highly anomalous attributes include a feature for aggregating data, a manner in which to aggregate data, and a temporal window for which to aggregate data.

At block 1304, data used to generate a highly anomalous threshold may be obtained and pre-processed. In some cases, such pre-processing may include generating or transforming data, filtering data, etc.

At block 1306, data values in association with various temporal windows may be aggregated, for example, as specified via the obtained highly anomalous attributes. For example, assume a temporal window is one hour and data is to be summed during each one hour increment. In such a case, the data values that fall within a first one hour increment may be totaled, the data values that fall within a second one hour increment may be totaled, and so on.

At block 1308, maximum values associated with the aggregated data values are identified. The specific maximum values to identify may be based on an identification of whether the data is deemed sparse or dense. In embodiments, maximum values are identified in association with a maximum-value time duration. For example, assume a maximum-value time duration is three hours with a dense data set. In such a case, over a first three hour time duration, a first maximum value may be identified, over a second three hour time duration, a second maximum value may be identified, and so on.

At block 1310, the maximum values are used to generate a data distribution, such as an extreme value distribution. In this regard, parameters of the data distribution may be identified, and the maximum values may be fitted to the data distribution.

At block 1312, the data distribution and a confidence threshold value are used to identify a highly anomalous threshold. Thereafter, the highly anomalous threshold can be used to identify highly anomalous data (e.g., based on a comparison to the highly anomalous threshold).

Turning to FIG. 14, FIG. 14 illustrates an example of a process that may be performed to facilitate efficient identification of highly anomalous data, in accordance with embodiments described herein. In some embodiments, aspects of FIG. 14 may be performed by an analytics service, such as analytics service 611 of FIG. 6.

Initially, at block 1402, a highly anomalous threshold is identified based on an extreme value distribution representing a set of maximum values. In embodiments, the maximum values are selected from a time-series dataset of values aggregated in accordance with a rolling temporal window. In other embodiments, the maximum values are selected based on a top or highest n maximum values.

At block 1404, a highly anomalous data value is identified using the highly anomalous threshold. The highly anomalous data value can be identified based on a comparison of the data value to the threshold. At block 1406, an anomaly score is generated for the highly anomalous data value. The anomaly score can indicate an extent or probability of the value being highly anomalous.

At block 1408, context data is identified in the association with the highly anomalous data value to analyze suspiciousness of the identified highly anomalous data value and used to adjust the anomaly score. Thereafter, at block 1410, the adjusted anomaly score is used to determine to provide an alert in association with the highly anomalous data value. The alert may include an indication of the highly anomalous data value, the adjusted anomaly score, the context data, among other things. Accordingly, the user may view the alert identified as highly anomalous and verified as suspicious.

6.0. Terminology

Computer programs typically comprise one or more instructions set at various times in various memory devices of a computing device, which, when read and executed by at least one processor, will cause a computing device to execute functions involving the disclosed techniques. In some embodiments, a carrier containing the aforementioned computer program product is provided. The carrier is one of an electronic signal, an optical signal, a radio signal, or a non-transitory computer-readable storage medium.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data-processing apparatus to produce a machine, such that the instructions, which execute via the processor(s) of the computer or other programmable data-processing apparatus, create means for implementing the acts specified in the flow chart and/or block diagram block or blocks. These computer program instructions may also be stored in a non-transitory computer-readable memory that can direct a computer or other programmable data-processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data-processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further implementations of the disclosure. These and other changes can be made to the disclosure in light of the above Detailed Description. While the above description describes certain examples of the disclosure, and describes the best mode contemplated, no matter how detailed the above appears in text, the disclosure can be practiced in many ways. Details of the system may vary considerably in its specific implementation, while still being encompassed by the disclosure disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific examples disclosed in the specification, unless the above Detailed Description section explicitly defines such terms. Accordingly, the actual scope of the disclosure encompasses not only the disclosed examples, but also all equivalent ways of practicing or implementing the disclosure under the claims.

To reduce the number of claims, certain aspects of the disclosure are presented below in certain claim forms, but the applicant contemplates other aspects of the disclosure in any number of claim forms. For example, while only one aspect of the disclosure is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A computer-implemented method, comprising:

identifying one or more maximum values within a set of aggregated values corresponding with a sequence of time spans;

generating an extreme value distribution based on the one or more maximum values;

determining a highly anomalous threshold using a confidence threshold and the extreme value distribution based on the one or more maximum values;

identifying a highly anomalous data value associated with a security-related analysis based on the highly anomalous threshold; and providing, for display, an indication of the highly anomalous data value associated with the security-related analysis.

2. The computer-implemented method of claim 1 further comprising generating the set of aggregated values corresponding with the sequence of time spans, wherein each aggregated value of the set of aggregated values comprises an aggregation of data values falling within a particular time span of the sequence of time spans.

3. The computer-implemented method of claim 1, wherein an aggregated value of the set of aggregated values comprises a total, an average, or a median of data values falling within a particular time span of the sequence of time spans.

4. The computer-implemented method of claim 2, wherein generating the set of aggregated values is performed in accordance with one or more highly anomalous attributes obtained via a configuration file.

5. The computer-implemented method of claim 4, wherein the one or more highly anomalous attributes comprise an indication of a duration of the time spans, a manner for use in aggregating values, and a feature for which values are to be aggregated.

6. The computer-implemented method of claim 1, wherein the one or more maximum values are identified using a predetermined number of maximum values to select.

7. The computer-implemented method of claim 1, wherein the one or more maximum values are identified by selecting a maximum value within a set of maximum-value time durations.

8. The computer-implemented method of claim 1, wherein the set of aggregated values comprises a time-series dataset, wherein each aggregated value in the time-series dataset comprises an aggregation of values associated with a particular feature and that correspond with a particular time span.

9. The computer-implemented method of claim 1, wherein the extreme value distribution is generated by identifying one or more parameters for the extreme value distribution using a Maximum Likelihood Estimation.

10. The computer-implemented method of claim 9, wherein the one or more parameters are optimized using a Newton-Raphson technique.

11. The computer-implemented method of claim 1, wherein the extreme value distribution comprises a Gumble distribution.

12. The computer-implemented method of claim 1, wherein the confidence threshold is obtained as a highly anomalous attribute via a configuration file for the security-related analysis.

13. The computer-implemented method of claim 1, wherein the highly anomalous data value is identified based on a comparison of the highly anomalous data value to the highly anomalous threshold.

14. The computer-implemented method of claim 1 further comprising:

generating an anomaly score associated with the highly anomalous data; and providing the anomaly score for display in association with the indication of the highly anomalous data value.

15. The computer-implemented method of claim 1 further comprising:

identifying context data related to the highly anomalous data value; and adjusting an anomaly score associated with the highly anomalous data value based on the identified context data.

16. The computer-implemented method of claim 1 further comprising:

identifying context data related to the highly anomalous data value; and providing the context data for display in association with the indication of the highly anomalous data value.

17. The computer-implemented method of claim 1 further comprising:

generating an anomaly score associated with the highly anomalous data value and context data identified in relation to the highly anomalous data value;

determining the anomaly score is greater than a threshold value; and based on the anomaly score being greater than the threshold value, generating an alert that indicates at least one of the highly anomalous data value, the anomaly score, or the context data identified in relation to the highly anomalous data value.

18. The computer-implemented method of claim 1, wherein the security-related analysis corresponds to one of a password spray analysis, a failed login analysis, a data exfiltration analysis, a kerberoasting analysis, a ransomware analysis, a crypto mining analysis, a resource destroying analysis, an access key creation analysis, or an internal threat analysis.

19. A computing device, comprising:

a processor; and a non-transitory computer-readable medium having instructions stored thereon that, when executed by the processor, cause the processor to perform operations including:

identifying one or more maximum values within a set of aggregated values corresponding with a sequence of time spans;

generating an extreme value distribution based on the one or more maximum values;

determining a highly anomalous threshold using a confidence threshold and the extreme value distribution based on the one or more maximum values;

identifying a highly anomalous data value associated with a security-related analysis based on the highly anomalous threshold; and providing, for display, an indication of the highly anomalous data value associated with the security-related analysis.

20. A non-transitory computer-readable medium having stored instructions thereon that, when executed by one or more processors, cause the one or more processors to perform operations including:

identifying one or more maximum values within a set of aggregated values corresponding with a sequence of time spans;

generating an extreme value distribution based on the one or more maximum values;

determining a highly anomalous threshold using a confidence threshold and the extreme value distribution based on the one or more maximum values;

identifying a highly anomalous data value associated with a security-related analysis based on the highly anomalous threshold; and providing, for display, an indication of the highly anomalous data value associated with the security-related analysis.

* * * * *